United States Patent
Osman

(10) Patent No.: US 9,736,613 B2
(45) Date of Patent: Aug. 15, 2017

(54) SOUND LOCALIZATION FOR USER IN MOTION

(71) Applicant: Sony Interactive Entertainment Inc., Tokyo (JP)

(72) Inventor: Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/706,575

(22) Filed: May 7, 2015

(65) Prior Publication Data
US 2015/0245159 A1    Aug. 27, 2015

Related U.S. Application Data

(63) Continuation of application No. 13/478,582, filed on May 23, 2012, now Pat. No. 9,037,468.

(60) Provisional application No. 61/523,100, filed on Aug. 12, 2011, provisional application No. 61/539,676, filed on Sep. 27, 2011.

(51) Int. Cl.
*G10L 21/00* (2013.01)
*H04S 7/00* (2006.01)

(52) U.S. Cl.
CPC .............. *H04S 7/302* (2013.01); *H04S 7/304* (2013.01)

(58) Field of Classification Search
CPC .................................................. G06F 9/4448
USPC ........................................................ 704/270
See application file for complete search history.

(56) References Cited

U.S. PATENT DOCUMENTS

| 2004/0193413 A1* | 9/2004 | Wilson .................... G06F 3/017 704/243 |
| 2005/0108646 A1 | 5/2005 | Willins et al. |
| 2006/0119572 A1* | 6/2006 | Lanier .................. G06F 1/1601 345/156 |
| 2008/0159544 A1 | 7/2008 | Kim |
| 2009/0099836 A1 | 4/2009 | Jacobsen et al. |
| 2011/0141011 A1* | 6/2011 | Lashina .................. G06F 3/013 345/156 |

(Continued)

FOREIGN PATENT DOCUMENTS

| CN | 101459797 A | 6/2009 |
| CN | 101771814 A | 7/2010 |

(Continued)

*Primary Examiner* — Jakieda Jackson
(74) *Attorney, Agent, or Firm* — Martine Penilla Group, LLP

(57) ABSTRACT

Methods, apparatus, and computer programs for simulating the source of sound are provided. One method includes operations for determining a location in space of the head of a user utilizing face recognition of images of the user. Further, the method includes an operation for determining a sound for two speakers, and an operation for determining an emanating location in space for the sound, each speaker being associated with one ear of the user. The acoustic signals for each speaker are established based on the location in space of the head, the sound, the emanating location in space, and the auditory characteristics of the user. In addition, the acoustic signals are transmitted to the two speakers. When the acoustic signals are played by the two speakers, the acoustic signals simulate that the sound originated at the emanating location in space.

7 Claims, 14 Drawing Sheets

(56) References Cited

U.S. PATENT DOCUMENTS

| | | | |
|---|---|---|---|
| 2012/0093338 A1* | 4/2012 | Levi | H04R 3/005 |
| | | | 381/92 |
| 2012/0097012 A1* | 4/2012 | Kurihara | H04R 29/008 |
| | | | 84/464 R |
| 2012/0308057 A1* | 12/2012 | Edwards | H04R 25/305 |
| | | | 381/313 |
| 2013/0169626 A1* | 7/2013 | Balan | G06T 19/006 |
| | | | 345/419 |
| 2013/0304479 A1* | 11/2013 | Teller | G06F 3/013 |
| | | | 704/275 |

FOREIGN PATENT DOCUMENTS

| | | |
|---|---|---|
| CN | 101835072 A | 9/2010 |
| CN | 101960866 A | 1/2011 |

* cited by examiner

Fig. 1A    Fig. 1B
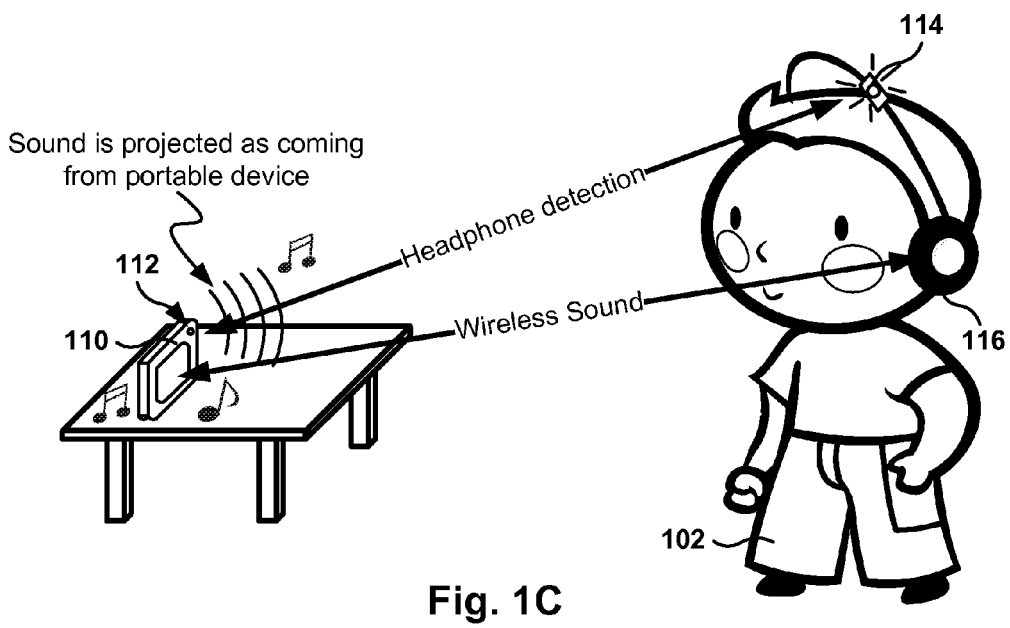
Fig. 1C

SOUND LOCALIZATION FOR USER IN MOTION

CLAIM OF PRIORITY

This application is a Continuation Application under 35 USC §120 of U.S. application Ser. No. 13/478,582, entitled "SOUND LOCALIZATION FOR USER IN MOTION," filed May 23, 2012, which claims priority from U.S. Provisional Patent Application No. 61/523,100, filed Aug. 12, 2011, entitled "Sound Localization for User in Motion," and from U.S. Provisional Patent Application No. 61/539,676, filed Sep. 27, 2011, entitled "Sound Localization for User in Motion," all of which are incorporated herein by reference.

CROSS REFERENCE TO RELATED APPLICATIONS

This application is related to U.S. patent application Ser. No. 12/947,290, filed Nov. 16, 2010, and entitled "Maintaining Multiple Views on a Shared Stable Virtual Space"; U.S. application Ser. No. 12/973,827, filed on Dec. 20, 2010, and entitled "Calibration of Portable Devices in a Shared Virtual Space"; and U.S. application Ser. No. 12/259,181, filed on Oct. 27, 2008, and entitled "Determining Location and Movement of Ball-Attached Controller," all of which are incorporated herein by reference.

BACKGROUND

1. Field of the Invention

The present invention relates to methods for delivering sound, and more particularly, methods, systems, and computer programs for simulating the source of the sound in a three-dimensional space.

2. Description of the Related Art

A growing trend in the computer gaming industry is the development of games that increase the interaction between user and gaming system, and that provide a more realistic experience for the player. One way of accomplishing a richer interactive experience is by utilizing surround systems that deliver a plurality of sounds originating in a plurality of speakers. However, current surround systems do not take into account the physical aspects of the user, the location of the user, the movement of the user, or the virtual location of virtual objects within a physical three-dimensional space.

In some environments, such as a movie theater, the sound is delivered under the assumption that the viewers are looking at the screen. Since the sound is delivered to the group of users, the sound delivery does not take into account the characteristics of the user, or the actual location of the user with reference to the speakers generating the sound.

In another scenario, when a user is listening to music coming from a portable device, the listening experience is different when the sound is coming directly from the portable device than when the user is wearing headphones.

It is in this context that embodiments of the invention arise.

SUMMARY

Embodiments of the present invention provide methods, apparatus, and computer programs for simulating the source of sound. Embodiments of the invention track the location where the sound is to be originated, as well of the current location of the user, in order to project the sound as if the sound were coming from the simulated sound origin, which is within a three-dimensional space. For example, the sound may appear to originate at a portable device, an object within a game, a virtual object virtually embedded into and augmented reality space, a player, etc.

It should be appreciated that the present invention can be implemented in numerous ways, such as a process, an apparatus, a system, a device or a method on a computer readable medium. Several inventive embodiments of the present invention are described below.

In one embodiment, a method includes an operation for determining a location in space of a head of a user, where the location is determined utilizing face recognition of images of the user. In addition, a sound is determined for delivery to two speakers, each speaker being associated with an ear of the user. The method also includes an operation for determining the emanating location in space for the sound, and an operation for establishing acoustic signals for each speaker based on the location in space of the head, the sound, the emanating location in space, and auditory characteristics of the user. The acoustic signals are transmitted to the two speakers, and when the acoustic signals are played by the two speakers, the acoustic signals simulate that the sound originated at the emanating location in space.

In another embodiment, a method for simulating a source of sound includes an operation for determining, with a first device, a first location of a head of a first user. In another operation, a second location, corresponding to the head of a second user, is received, where the second location is determined with a second device. In addition, the method includes an operation for determining a third location corresponding to a location of the second device with reference to the first device, and another operation for establishing acoustic signals for a plurality of speakers based on the first location, the second location, and auditory characteristics of the first user. The acoustic signals are transmitted to the plurality of speakers, where the acoustic signals, when played by the plurality of speakers, simulate that a sound associated with the acoustic signals originated at the second user.

In yet another embodiment, a method for simulating a source of sound includes an operation for determining a first location corresponding to a head of a user, and another operation for determining a second location corresponding to an object. The second location is determined utilizing image analysis of a space around the user. Furthermore, acoustic signals for a plurality of speakers are established based on the first location, the second location, and the auditory characteristics of the user, where the plurality of speakers is situated in a space around the user. The acoustic signals are transmitted to the plurality of speakers, where the acoustic signals, when played by the plurality of speakers, simulate that a sound associated with the acoustic signals originated at the object.

In another embodiment, a method for simulating the source of sound includes an operation for generating a plurality of acoustic cues, each acoustic cue associated with a location in space. In another operation of the method, an input from a user is received for each acoustic cue, each input having information about a perceived location of the corresponding acoustic cue. A sound localization function is built for the user based on the received inputs, where the sound localization function is built by selecting an existing sound function from a plurality of existing sound functions, or by combining more than one existing sound functions from the plurality of existing sound functions. Additionally, a sound is delivered to a plurality of speakers to simulate an origin of the sound based on the sound localization function, a location of the user, and a desired perceived location for the origin of the sound.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

FIGS. 1A-1C illustrate different embodiments for sound delivery to a user from a portable device.

DETAILED DESCRIPTION

Figure 2:
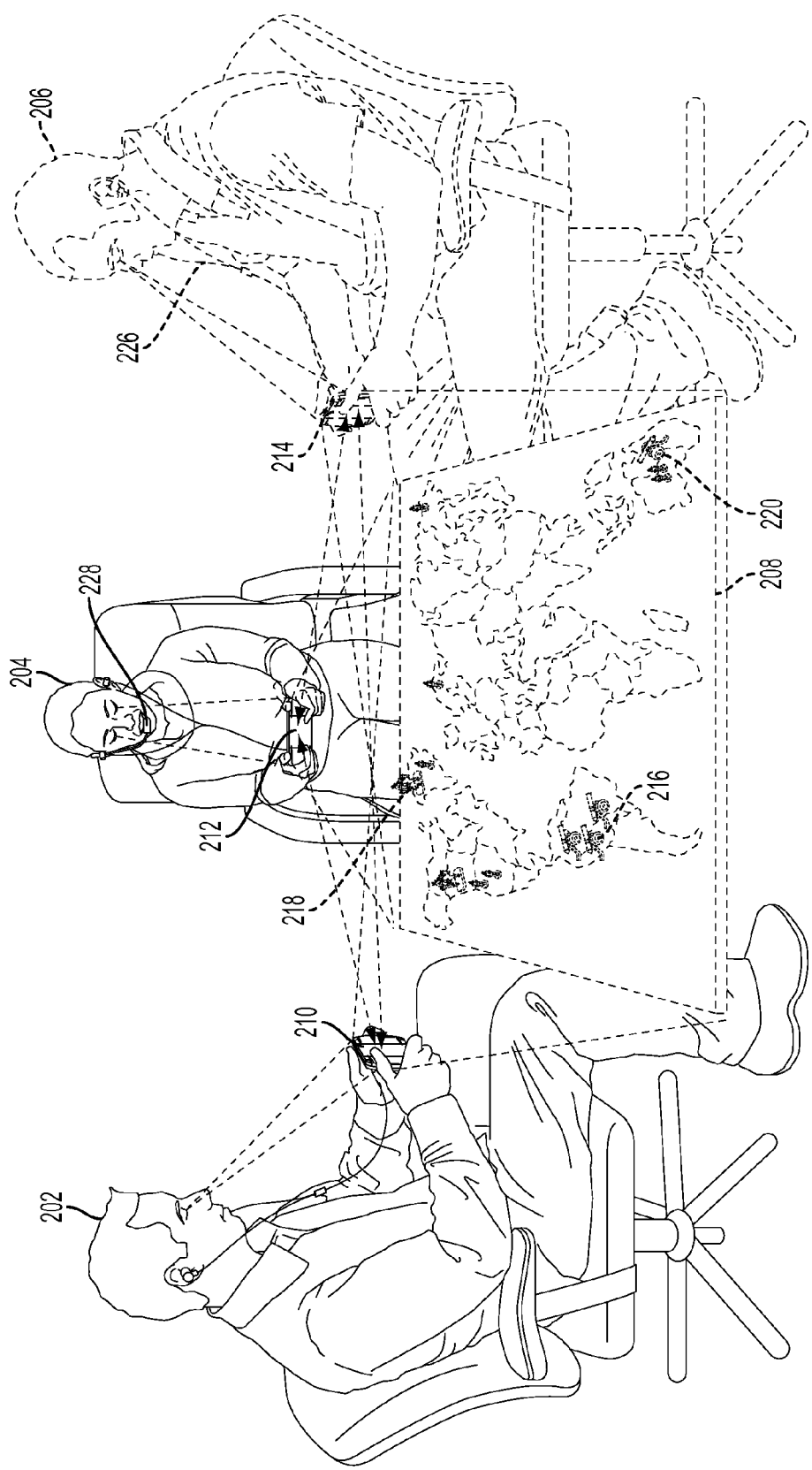
FIG. 2 depicts a multi-player augmented-reality environment, according to one embodiment.

The following embodiments describe methods, computer programs, and apparatus for simulating the source of sound. It will be apparent, that the present embodiments may be practiced without some or all of these specific details. In other instances, well known process operations have not been described in detail in order not to unnecessarily obscure the present embodiments.

FIGS. 1A-1C illustrate different embodiments for sound delivery to a user from a portable device. FIG. 1A shows user 102 listening to music emanating from portable device 104, and FIG. 1B shows user 102 listening to music while wearing headphones 106. When the user wears the headphones, there is a disconnect between where the sound is perceived to originate (right up against the ears), and where the sound is actually emanating from (the portable device). Therefore, user 102 gets a different experience while wearing headphones that when listening to music without wearing headphones. Embodiments of the invention, allow the user wearing headphones to have a similar experience to the one experienced when the user is not wearing headphones.

Sound localization refers to a listener's ability to identify the location or origin of a detected sound in direction and distance. It may also refer to the methods in acoustical engineering to simulate the placement of an auditory cue in a virtual 3D space. The human auditory system uses several cues for sound source localization, including time and level differences between both ears, spectral information, timing analysis, correlation analysis, and pattern matching.

Humans have two ears, but can locate sounds in three dimensions—in range (distance), in direction above and below, in front and to the rear, as well as to either side. The brain, the inner ear, and the external ear work together to make inferences about location. Humans estimate the location of a source by taking cues derived from one ear (monaural cues), and by comparing cues received at both ears (difference cues or binaural cues). Among the difference cues are time differences of arrival and intensity differences. The monaural cues come from the interaction between the sound source and the human anatomy, in which the original source sound is modified before the sound enters the ear canal for processing by the auditory system. These modifications encode the source location, and may be captured via an impulse response which relates the source location and the ear location. This impulse response is termed the head-related impulse response (HRIR). Convolution of an arbitrary source sound with the HRIR converts the sound to that which would have been heard by the listener if the sound had been played at the source location, with the listener's ear at the receiver location. HRIRs can be used to produce virtual surround sound.

A sound localization function $f$ (also known herein as a sound function, a localization function, and sometimes plainly as a "function") is a function or algorithm that generates a localized sound based on a sound and the location in space perceived as the origin of the sound. The localized sound, when played through speakers, gives the impression to the listener that the sound originated in the desired location, even though the sound is really originating at the speakers. The function $f$ can be mathematically expressed as:

$$ls = f(s, l) \tag{1}$$

Where s is the sound (e.g., a dog bark), l is the location where the sound is supposed to originate, and ls is the localized sound. One example of a sound localization function is a Head-Related Transfer Function (HRTF), which is a response that characterizes how an ear receives a sound from a point in space. A pair of HRTFs for the ears may be utilized to synthesize a binaural sound that seems to come from a particular point in space. The HRTF can also be described as the modifications to a sound from a direction in free air to the sound arriving at the eardrum. These modifications include the shape of the listener's outer ear, the shape of the listener's head and body, the acoustical characteristics of the space in which the sound is played, and so on. All these characteristics influence how a listener can accurately tell what direction a sound is coming from. Due to the physical differences of each person, each person has a different HRTF. Embodiments of the invention for sound localization are described using HRTF, but any other form of sound localization that accounts for the physical characteristics of a listener can be utilized with embodiments of the invention.

FIG. 1C illustrates an embodiment of the invention, where the sound delivered at headphones 116 is modified, such that user 102 perceives the sound delivered by the headphones 116 as if the sound was emanating from portable device 110, instead of perceiving the sound coming directly from the headphones 116. Portable device 110 tracks the location of the headphones (also referred to as headset, earphones, or earpiece), with reference to the location of the portable device 110. Once the relative location of the headphones with reference to the portable device is known, the portable device manipulates the sound (e.g., using the user's HRTF) to generate localized sound in order to make the user believe that the sound is coming directly from portable device 110. In the embodiment shown in FIG. 1C, the localized sound is transmitted wirelessly to the wireless headphones 116. Once the localized sound is played by the headphones 116, the user gets the experience that the sound is coming from portable device 110.

Different people have different HRTF's, and the most compelling experience is delivered when that HRTF of the user is utilized. In one embodiment, a standard HRTF is utilized when the HRTF for the user is not available. The standard HRTF takes into account the average characteristics of a human being. Although the HRTF of the user is not utilized, the standard HRTF can still provide a realistic experience for the user. In addition, calibration methods can be utilized to further customize the sound localization experience for the particular user to develop an HRTF for the user.

There are multiple ways for tracking the position of the headphones, which in turn define the position of the user's ears. In general, we refer to herein as tracking the location of the user's ears, because the location of the ears determines how the sound is to be localized. For ease of description, we refer to herein sometimes to tracking the location of the user, tracking the location of the head of the user, or tracking the location of the headphones that the user is wearing. All these methods of tracking are equivalent, as the location of the ears can be deduced from the location of the head, the user, or the headphones.

In the embodiment of FIG. 1C, headphones 116 include a source of light, such as Light-Emitting Diodes (LED) 114. Camera 112 in portable device 110 takes images of the space where user 102 is situated, and portable device 112 then performs image analysis to determine the location of LED 114. The brighter spot in the image assists in the identification of the location of the LED. In addition, the distance from the portable device to the headphones is estimated based on the size of the LED 114 in the images taken by camera 112. Once the location of the LED 114 is determined, the location of the user's ears is estimated by assuming that the LED is situated between the ears and a few inches above the line that connects the ears, according to the physical characteristics of the headphones.

It is noted that the embodiment illustrated in FIG. 1C is exemplary. Other embodiments may utilize different methods for tracking the location of the user's ears, or a combination of tracking methods can be utilized to increase accuracy. For example, location tracking can be performed using face recognition, ultrasound communication, RFID, infrared lights, Global Positioning System (GPS), etc. The embodiment illustrated in FIG. 1C should therefore not be interpreted to be exclusive or limiting, but rather exemplary or illustrative.

Sound projection provides a compelling experience for the user, making the headphones "disappear" out of the listening experience. The user does not feel that the sound is coming from two speaker elements situated around the ears, but rather that the sound is coming from a particular point in space, which, depending on the situation, can be associated with the portable device, virtual elements from a game, a virtual user, etc. As the virtual source of sound changes or as the position of the user changes, the sound projection adapts so the sound appears to be emanating from the correct location.

FIG. 2 depicts a multi-player augmented-reality environment, according to one embodiment. In a shared-space game, a plurality of devices exchange positional and game information to provide a virtual multiplayer experience, where the displays of the users project a shared virtual space. This allows each player's system access to the camera view and positional information from all other players to synchronize their calibrated positions and share a virtual space, also referred to as shared space, together.

In the embodiment of FIG. 2, players 202 and 204 are in the same room, while player 206 is playing remotely (represented as a virtual player in dashed lines). After players 202 and 204 have synchronized or calibrated their portable devices in reference to a point in the common 3D space (such as a point on a table), the common virtual scene 208 is created. In similar fashion, player 206 synchronizes his portable device to a point in the space around player 206.

Each player has a view of the virtual scene 208 as if the virtual scene, a battle board game in this case, were real on a table in front of the players. The portable devices act as cameras, such that when a player moves the device around, the view changes the same way that a camera changes the display as the camera is pointed in different directions. As a result, the actual view on each display is independent from the view in other displays, and the view is based only on the relative position of the portable device with respect to the virtual scene, which is anchored to an actual physical location on the 3D space.

By utilizing multiple cameras, accelerometers and other mechanical devices to determine position, together with high speed communication between portable devices, it is possible to create a 3D motion capture-like experience allowing players to see, and possibly touch, virtual game characters and environments in believable ways.

Share space games utilize devices' high-speed connectivity to exchange information among the devices participating in the Share Space game experience. The virtual scene 208 play area is viewed through the device by turning the device into a stable "magic window" that persists in a space between each of the devices. By using a combination of motion tracking, image analysis, and high persistence of information between each device, the play area appears in a stable position even if when devices move around. Embodiments of the invention enhance the augmented reality experience, to include not only what the user sees, but also what the user hears.

During game play, player 202 perceives that sounds come from virtual objects on the board, such as army 218 or cannon 220, from the other players 204 and 206, from the portable devices 212 and 214 held by the players, etc. In one embodiment, the players are wearing headphones 226 that may include a microphone 228.

When user 202 plays the game, portable device 210 re-creates the virtual augmented reality, in which the other players 204 and 206 are seated around the table that is in front of player 202. Once the players have an assigned place in the virtual space, the sound originated by these players (e.g., speech) is then simulated into the augmented reality space. When remote player 206 talks, the speech is transmitted to portable device 210, which in turn modifies the speech so player 202 perceives the speech of player 206 localized to the virtual position of player 206 in the same room where player 202 is situated.

Each portable device tracks the position of the respective player, and the player position information is shared among the portable devices. If a player moves in relation to the portable device the player is holding, the position of the player is shared with the other portable devices, and when the player talks, the speech is localized to the place where the player is currently situated. When two players are nearby (e.g., players 202 and 204), the portable devices must track, not only the position of the player holding the portable device, but also the location of the other portable devices nearby. In one embodiment, the location of the other portable device is tracked in similar fashion to the way the players are tracked (e.g., via image recognition of images taken with a camera). In another embodiment, the portable devices define a common point in space (e.g., the center of the table), and then each portable device tracks the position of the portable device with reference to the common point. The location of the portable device with reference to the common point is then shared with the other portable devices in order to determine the relative position between the portable devices.

It should be noted that sounds do not have to originate within the space covered by the display in the portable device. The sounds might come from objects or players that are outside the field of view. For example, a player might be looking straight ahead while sound might come from the right of the player. This sound then becomes a cue for the player as to the whereabouts of the object or person that originated the sound coming from the right. However, it should be noted that a good HRTF model will greatly improve the accuracy of sound localization for objects outside the field of display. This is because inaccuracies in virtual surround systems are ignored by the brain in the presence of visual feedback. If the player thinks that the sound is coming from a visible object, even if there is some error in the sound transmission, the brain uses the visual information to identify the sound origin. However, when the sound originates outside the field of view, the extra visual cue for sound localization is lost. In this case, a good HRTF enhances sound localization for objects outside the field of view.

Sound localization in augmented reality games can be applied to many types of games. In a shooting game, a shot fired by another player appears to come from the other player's weapon. In an adventure game, the speech of a character appears to come from the location of the character. In a multiplayer game, the speech from another player appears to come from the location of the talking player.

In one embodiment, the speech coming out of a player is generated by a computer program. For example, a player texts a message to another player, and the computer program "reads" the text message to the other player using sound localization, which makes the computer-generated speech appear to come from the mouth of the texting player.

Furthermore, the speech generated by the virtual reality can be translated speech, that is, speech generated by a machine translation tool. For example, a remote player is talking in a foreign language, and as the remote player talks, the foreign speech is translated to the native language of the player receiving the speech.

Figure 3A:
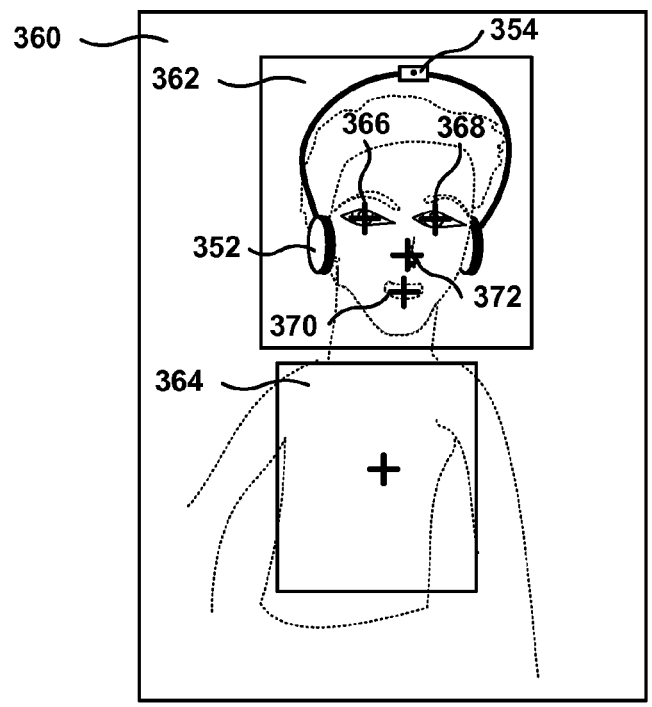
FIG. 3A illustrates a method for face recognition, in accordance with one embodiment of the invention.

FIG. 3A illustrates a method for face recognition, in accordance with one embodiment of the invention. In one embodiment, determining the location of the players face, or ears, is done utilizing image analysis of video images of play area 360, including the detection and tracking of user features such as eyes 366 and 368, face, nose 372, mouth 370, torso 364, etc. In the embodiment of FIG. 3A, facial features are tracked to estimate the three dimensional location of the head and to derive the positions of the ears. The more features are tracked, the more reliable head tracking is. For example, if the user turns the head away from the camera, only one eye will be visible to the camera. By understanding the position of the nose and mouth, the system determines that the user has turned the head, instead of assuming a failure in detecting the face. Once the position of the user's ears is determined, sound localization is done on the sound, according to the origin of the sound, and the position of the ears.

In one embodiment, the images of the area where the user is located are taken by a face-facing camera in a portable device. In addition, a flashlight, or some other source of light, can be shined onto the user's face to improve face recognition.

In another embodiment, instead of the portable device tracking the user, a device associated with the user tracks the portable device. For example, headphones 352 include camera 354, and the images taken by camera 354 are used to find the portable device. In one embodiment, the images taken by camera 354 are sent to the portable device for image analysis. Once image analysis determines the location of the portable device, the location of the user in relation to the portable device is deduced, making sound localization possible.

It should be noted that the tracking methods described herein can be used in isolation or in any combination thereof. For example, the camera 354 on the headphones can be used to track the location of the portable device, while at the same time the portable device can be tracking the face of the user. In addition, other tracking methodologies can be utilized such as infrared light, ultrasound, GPS, RFID, etc. The information provided by these tracking methodologies can be combined to further improve tracking accuracy.

Figure 3B:
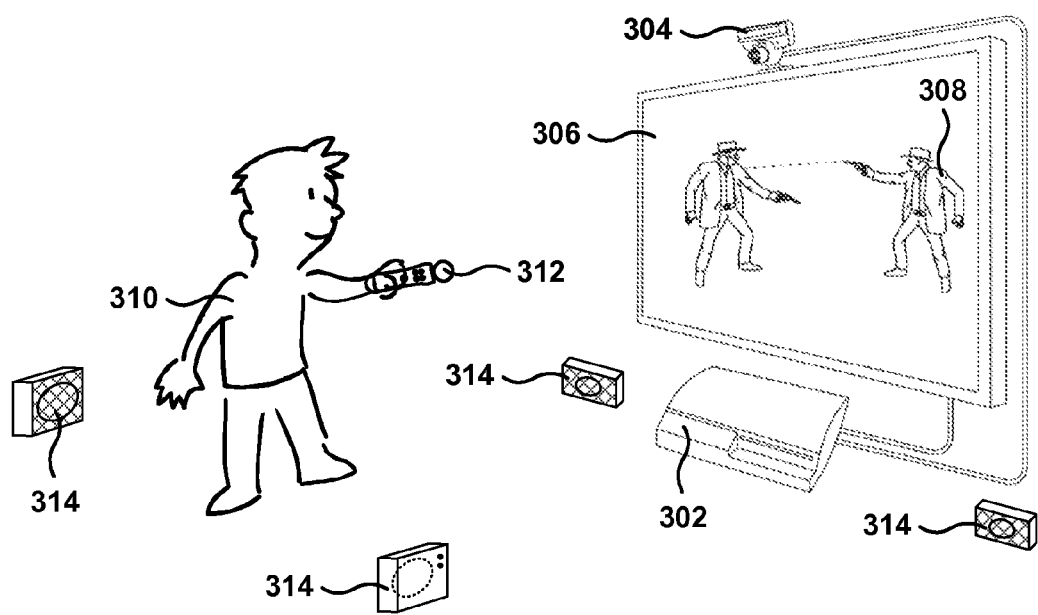
FIG. 3B illustrates the tracking of a user's head when the user is holding a trackable controller, according to one embodiment.

FIG. 3B illustrates the tracking of a user's head when the user is holding a trackable controller, according to one embodiment. The embodiment of FIG. 3B includes a game console 302, which is connected to image capture device 304. Controller 312 is trackable via image recognition or via other type of location tracking. When user 310 holds controller 312, game console 302 performs sound localization based on the location of the trackable controller, and based on the location of the user (e.g., using face recognition). A position tracking module, inside game console 302, determines the location in space of the head based on the location of the controller.

Two or more speakers 314, situated around user 310, receive sound signals from game console 302. When sound localization is performed, the sound signals sent to speakers 314 are modified according to the location of the user, the location where the sound is originated, and the location of the speakers. For example, if the shooter fires his gun from a location that is about 20 m from display 306, and the user is 3 m away from display 306, sound localization will modified the sound of the gun being fired so the shot appears to come from a location about 23 m away from user 310.

In general, the sound delivered to the user can be localized so the sound appears to emanate from game console 302, from a game object on display 306, from controller 312, from a virtual game object situated in the physical space of the user, etc. The position of the user is continuously tracked, and sound localization is based on the current location of the user. For example, if the user turns the head, sound localization changes so the sound appears to come from the correct location, even as the user is turning the head.

Figure 4:
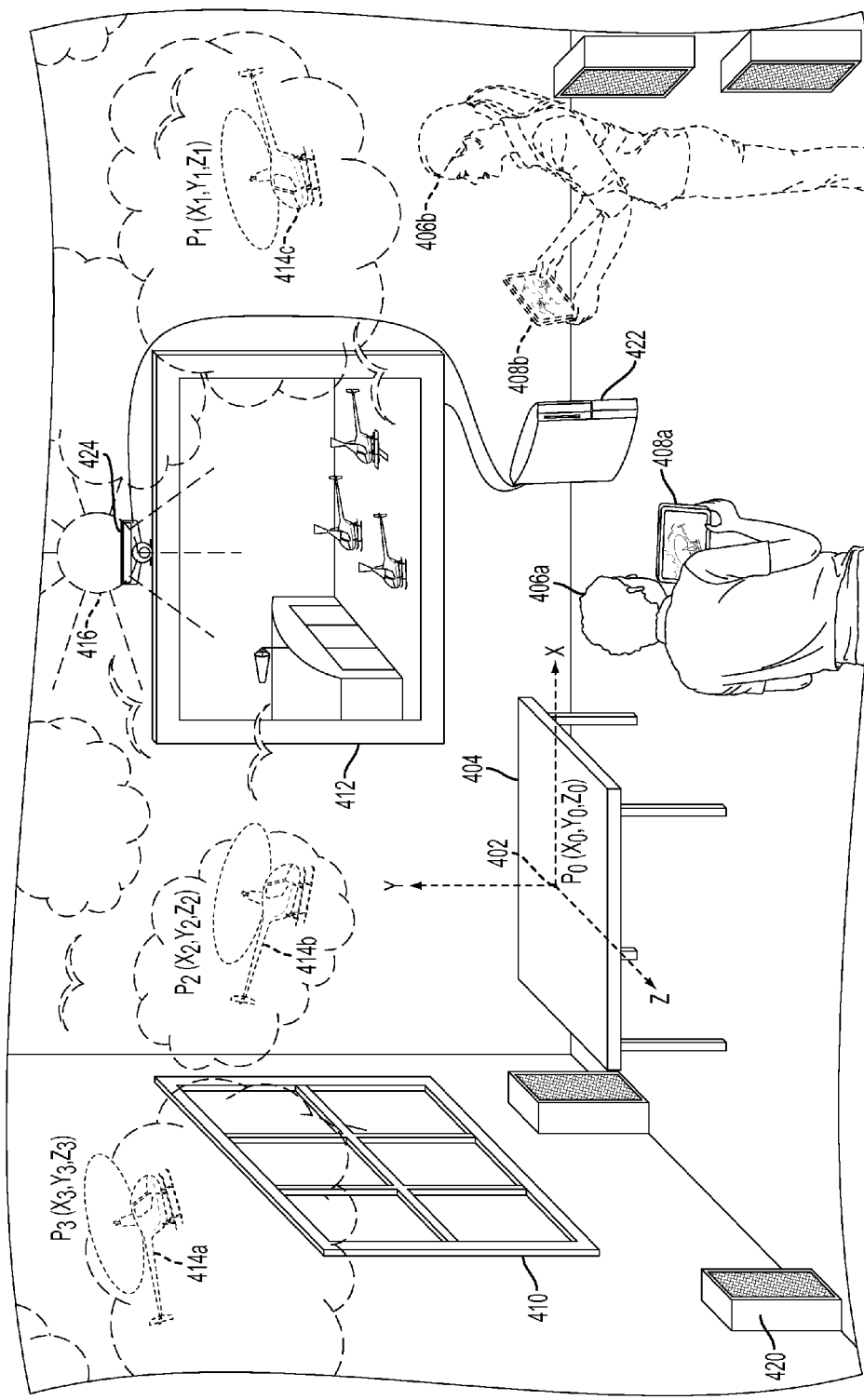
FIG. 4 illustrates an augmented-reality environment with realistic delivery of sound, according to one embodiment.

FIG. 4 illustrates an augmented-reality environment with realistic delivery of sound, according to one embodiment. Player 406a has synchronized device 408a to reference point 402, which is located on top of table 404. In one embodiment, point $P_0$ 402 is the reference point and is also the coordinate origin with coordinates ($X_0$=0, $Y_0$=0, $Z_0$=0). Although player 406a is inside a room, the virtual reality, also referred to herein as the virtual scene, may extend beyond the physical boundaries of the room. Player 406b is playing the same game as player 406a but in a remote location, and player 406b is represented as a virtual element in the game for player 406a. Player 406b is holding portable device 408b, which has been synchronized to another reference point in the physical space where player 406b is situated.

In one example embodiment, the virtual scene is tied to the reference point because the geometry of the virtual scene (as seen through a screen of the device) is based, at least in part, on the reference point. For example, the coordinates of the virtual objects in the virtual scene may be determined with respect to the reference point.

The coordinates can be measured using any standard of measure. However, to provide a visual example, and without limitation on actual coordinates used, if the coordinates of the virtual scene are measured in meters, an object with coordinates (1, 0, 0) would be situated one meter to the right of the reference point. Of course, the coordinates of objects, real or virtual, may be dynamically updated as the scene changes, such as when a virtual object moves within the scene. In addition, the changes can be defined by actions set by the computer (e.g., interactive program), driven by actions of the user, or combinations of both. Additionally, for sake of clarity, the interactive program can be any type of program, such as a video game, a business program, an internet interface, or simply a graphical user interface that provides access to data, to other users, to programs, or to objects that may or may not be displayed or projected by a speaker.

Further yet, other embodiments may have different coordinates systems or use scaling. For example, the coordinate system, instead of being a Cartesian system, can be polar, spherical, parabolic, etc. Additionally, the reference point does not have to be the origin of the coordinate system, and can be positioned at a different place. For sake of providing an example, the reference point can be located at coordinates (5, 5, 5) to enable a buffer of 5 meters in each direction before having to use negative coordinate values in points beyond the 5 meters. In another scenario, the virtual objects are built to scale and the coordinates are also measured in a scale. For example, the virtual objects may be built on a scale of 1:10, and the geometric axis can also have a scale of 1:10, such that an object with coordinates (1, 0, 0) is 1 meter away in the "real" world and 10 meters away in the virtual world.

In FIG. 4, virtual objects include helicopters 414a-414c, clouds, birds, sun 416, etc. As players 406a moves portable device 408a, the view of the virtual scene changes as if the player were holding a camera into the virtual world. It should be noted that the view shown in device 408a may include or may not include the reference point. The room includes other static objects besides table 404, such as television 412 and window 410.

As seen in FIG. 4, the virtual objects can be located anywhere in space. When the portable device includes a camera, the static features in the room can be used by the portable devices to maintain an accurate measurement of the current position by adjusting their inertial measurements with the views from their cameras. Image analysis in the portable device can detect the edges of a window, a light source, the edges of the table, a painting on the wall, a television, etc.

Game console 422 exchanges information with portable device 408a to deliver the augmented reality environment. The information includes one or more of game information, user tracking, portable device location, virtual object location, remote player location, etc.

In one embodiment, game console 422 tracks the location of the ears of player 406a. When sounds are generated in the game (e.g., the sound of a helicopter flying) game console 422 determines the coordinates in the virtual space of the sound origin. Once the location of the ears and the location of the sound origin are known, the game console 422 determines the relative location between the sound origin and the ears perceiving the sound. Game console 422 also has information regarding the location of speakers 420 in the room. The HRTF of the user is used to convert the sound into a localized sound that appears to the user as coming from the sound origin. The localized sound, which is transmitted to speakers 420, includes different acoustic signals for each of the speakers 420 in order to simulate the location of the sound origin.

In another embodiment, user 406a is wearing headphones (not shown). In this case the localized sound is delivered to the headphones instead of to the speakers. The algorithms for sound localization using speakers and using headphones are similar, but in the case of speakers, the location is fixed, while in the case of headphones the location has to be tracked because the headphones move when the user moves. Also, in the case of room speakers, there is a travel time for the sound coming from each speaker, which has to be considered by the sound localization algorithm.

The sound localization algorithm uses the HRTF of the user, as well as the current location of the user's ears to generate the localized sound for the earphones. The acoustic signals for the localized sound, which are played by the earphones, provide an acoustic clue to the user regarding the virtual location in space of the virtual object.

In one embodiment, the acoustic signals for the localized sounds are delivered with a higher volume when the object or person originating the sound is shown on the display of the portable device, or in the display 412 connected to game console 422. The portable device is acting, not only as a camera, but also as a directional microphone. When the sound origin is not on the display, the volume of the sound is lower. Because the portable device is working as a camera and as a directional microphone, the user has an acoustic cue to the whereabouts of the origin of the sound as the user moves the portable device.

Remote player 406b is assigned a position in the physical space of player 406a. Sound localization includes generating sounds that appear to come from player 406b or from portable device 408b. For example, when player 406b speaks, the speech is captured by portable device 408b and then transmitted to game console 422 or portable device 408a. The speech from user 406b is then transformed using HRTF, or some other sound localization algorithm, to deliver the speech to user 406a as if player 406b were standing near player 406a.

In one embodiment, GPS is used for tracking the user. For example, a GPS module in the portable device is used to determine the location of the portable device, that when combined with the tracking of the user by the portable device provides a GPS location for the user. If user 406b is situated in a remote location (e.g., a few miles away), the GPS location of user 406b can be used for sound effects. For example, user 406b has a game cannon, which is fired by the remote player. A sound effect simulates the fire of the cannon from the actual location of user 406b. The firing shot is heard first, and is followed by the sound of the cannonball as the cannonball travels through the air from the location of player 406b to the location of player 406a. As the cannonball travels through the air, the sound increases in intensity, as in real life. Finally, the explosion is heard when the cannonball hits the target, and if the target is near the user, the sound will be delivered with high volume.

Figure 5:
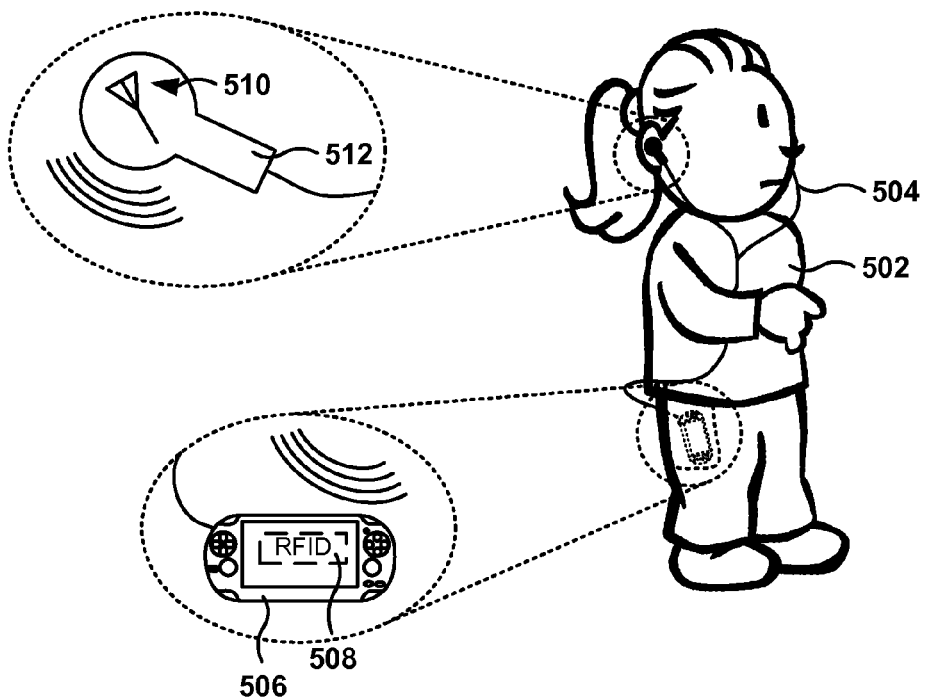
FIG. 5 illustrates a method for detecting the position of the head of a user utilizing Radio-Frequency Identification (RFID), according to one embodiment.

FIG. 5 illustrates a method for detecting the position of the head of a user utilizing Radio-Frequency Identification (RFID), according to one embodiment. User 502, wearing headphones 504, is carrying portable device 506 in her pocket. The portable device 506 includes an RFID module 508, and one or two of the earphones 512 in headphones 504 include an RFID tag 510. RFID module 508 is able to, not only read the information in RFID tag 510, but also to determine the direction and timing of the radio signal coming from RFID tag 510. Therefore, the use of RFID technology allows the portable device to get an estimate of the distance to the RFID tag 510 and the direction of the RFID signal. This way, even though there's not a line of sight between the RFID module 508 and the RFID tag 510, the portable device can still get an estimate of the location of earphones 512, which indicates the location of the ears of user 502. Other embodiments may use other types of wireless communication other than RFID, such as Bluetooth, Wi-Fi, radio transmissions, ultrasound, acoustic signals, etc.

In another embodiment, the headphones and the portable device include a GPS module. The GPS modules provide the absolute location in space of the head of the user and of the portable device. The position tracking module in the portable device utilizes the GPS positions to determine the location in space of the head in reference to the location of the portable device. Once the relative position is determined, the portable device is able to perform sound localization for the user, as previously described. Any type of GPS technology can be utilized, such as using the constellation of GPS satellites, or using mobile phone localization technology based on distance to mobile phone towers.

GPS technology can also be combined with other forms of tracking. For example, the portable device can include a GPS module, while the portable device tracks the location of the user's ears via image recognition. The GPS position of the portable device can be used in games with remote virtual players. The GPS positions of all the players are used to create sound effects that match the relative positions of the players to each other.

Figure 6:
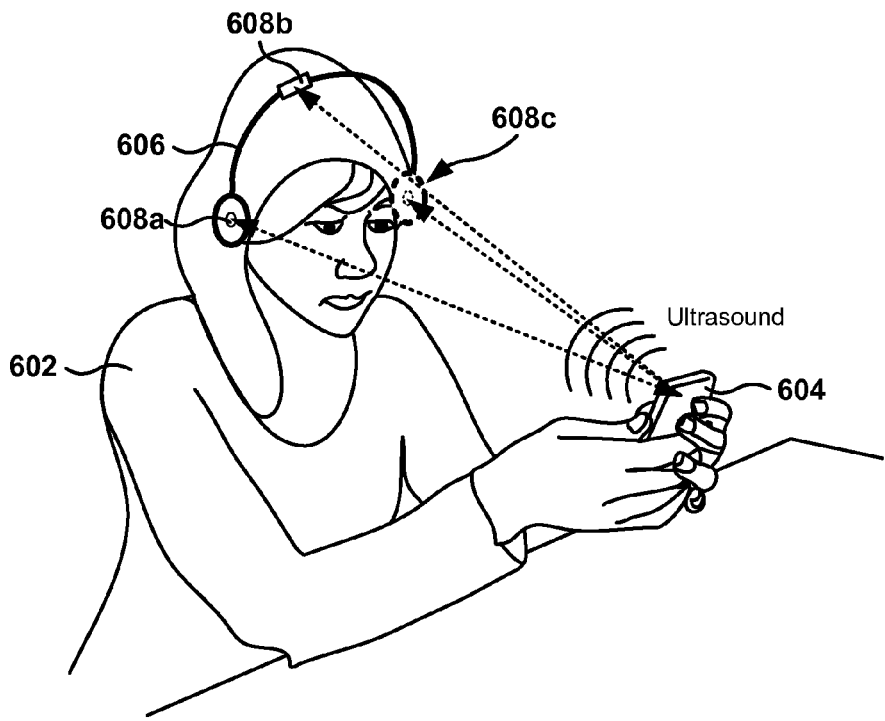
FIG. 6 illustrates a method for detecting the position of the head using triangulation, according to one embodiment.

FIG. 6 illustrates a method for detecting the position of the head using triangulation, according to one embodiment. In one embodiment (not shown), the headphones include an ultrasonic source, and the ultrasonic signals are used to track the location of the player's head. One or more directional microphones can be used to determine the location of the headphones, because the directional microphones provide the direction of the sound. In addition, timing the amount of time for the ultrasound to travel from the headphones to the portable device provides information for ranging the distance from the headphones to the microphones. When more than one microphone is available, triangulation can be used to fine-tune the location of the user.

In the embodiment of FIG. 6, the ultrasonic source is located at portable device 604. Headphones 606 include three ultrasonic microphones 608a-608c. The information captured by each of the microphones 608a-608c is transmitted to the portable device 604. The position tracking module in portable devices 604 analyzes the sound information captured by the microphones to determine the location of the headphones, which includes performing triangulation according to the direction of the sound and the arrival time of the sound to the microphones. The analysis performed by the position tracking module determines the relative location of the headphones with respect to the portable device.

Triangulation may also be utilized with other wireless technologies. For example, a portable device might include three RFID sensors that can read the RFID radio signals sent by the RFID tag. The RFID sensors are located spaced apart from each other in order to improve the estimation that includes triangulating the signal source. Similarly, the RFID tags can be located in the headphones, one on the right earphone, one of the left earphone, and a third one between the right and left earphones. It should be noted that other embodiments for triangulating signals may include a different number of sensors other than 3, such as 2, 4, etc. The embodiment illustrated in FIG. 6 should therefore not be interpreted to be exclusive or limiting, but rather exemplary or illustrative.

Figure 7:
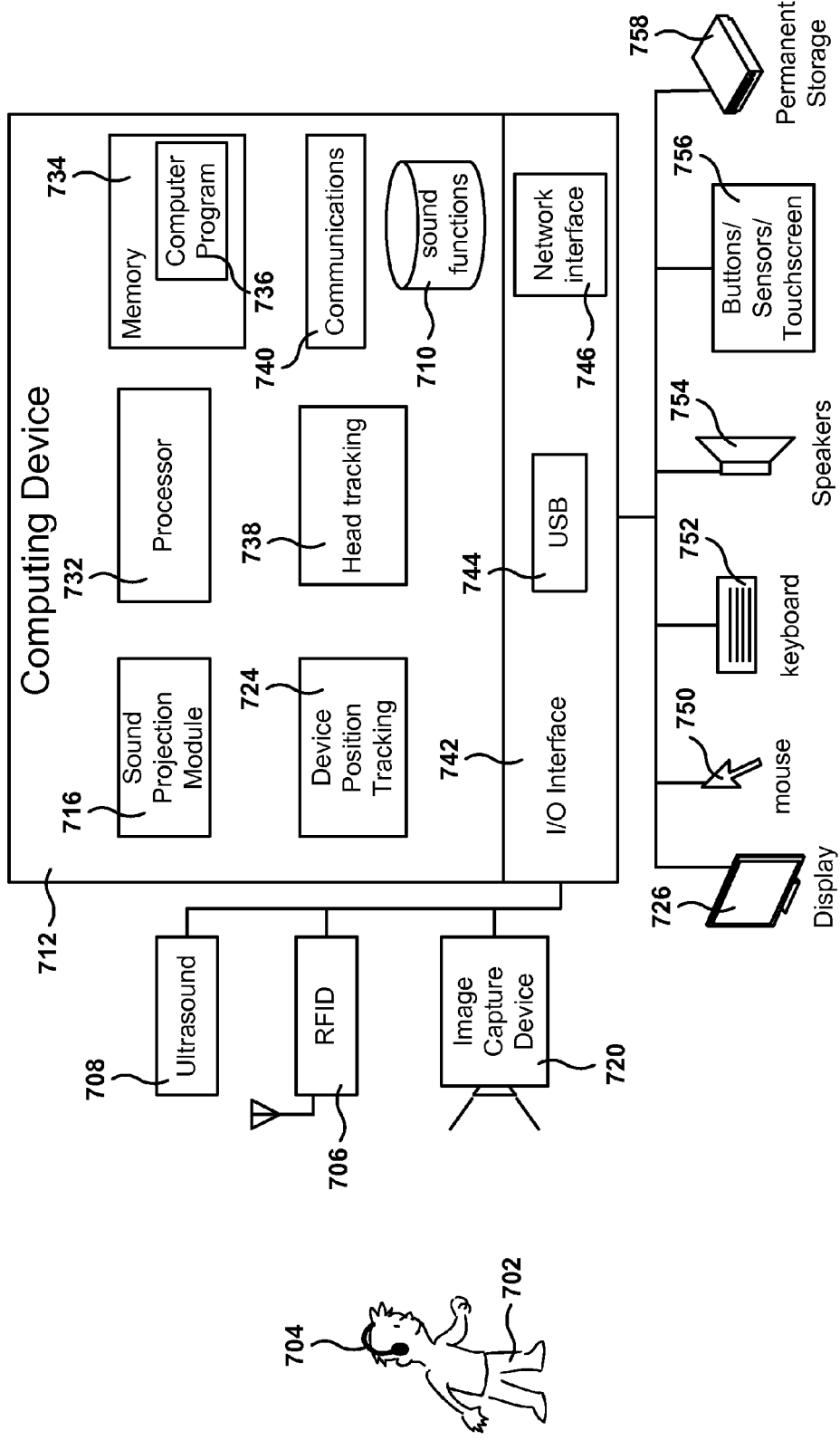
FIG. 7 is a simplified schematic diagram of a computer system for implementing embodiments of the present invention.

FIG. 7 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function, may be used in the alternative. Computing device 712 includes a processor 732, which is coupled to memory 734, to permanent storage device 758, and to other modules inside, or connected to, computing device 712. Sound localization computer program 736 resides in memory 734, but can also reside in permanent storage device 758.

Computing device 712 is in communication with ultrasound capture device 708, image capture device 720, and display 726. In one embodiment, sound capture device 708, image capture device 720, RFID module 706, and display 726 may be embedded within computing device 712 or be a separate unit. In one embodiment, the ultrasound capture device includes a microphone, and in another embodiment, the ultrasound capture device includes a microphone array.

Device Position Tracking module 724 determines the location of the portable device. A plurality of technologies can be used for position tracking such as ultrasound, GPS, RFID, image analysis, triangulation, inertial, etc., or a combination thereof. Head Tracking module 738 determines the position of one or two of the user's ears (which may be determined indirectly by determining a location of the headphones). Head Tracking module 738 may determine the position of the user's ears using one or more different technologies such as image recognition, RFID, ultrasound, infrared, triangulation, etc.

Sound Projection module 716 modifies sound signals, intended for delivery to a sound system, in order to perform sound localization, such that the user receiving the modified sound signals will have the impression that the sound emanates from the intended location. Sound projection module 716 uses the location information provided by device position tracking module 724 and head tracking module 738 to modify the sound signals.

Permanent storage device 758 represents a persistent data storage device such as a floppy disc drive or a fixed disc drive, which may be local or remote. Network interface 746 provides network connectivity, allowing communications with other devices. It should be appreciated that processor 732 may be embodied in a general-purpose processor, a special purpose processor, or a specially programmed logic device. Input/Output (I/O) interface 742 provides communication with different peripherals, such as display 726, keyboard 752, mouse 750, ultrasound capture device 708, image capture device 720, speakers 754, headphones 704, buttons, sensors, touchscreen 756, etc. A Universal Serial Bus (USB) module 744 provides connectivity to USB devices.

Display 726 is configured to display the user interfaces described herein. Keyboard 752, mouse 750, and other peripherals are coupled to I/O interface 742 in order to communicate information to processor 732. It should be appreciated that data to and from external devices may be communicated through I/O interface 742. The invention can also be practiced in distributed computing environments where tasks are performed by remote processing devices that are linked through a wire-based or wireless network.

Database 710 includes a plurality of sound localization functions associated with a plurality of different users. In one embodiment, the sound localization functions are the measured HRTF functions obtained for a plurality of users, but other sound localization functions can also be utilized. As discussed below with reference to FIGS. 9A-12, database 710 is used to build a sound localization function for the user that leverages existing functions obtained for other users.

It is noted that the embodiment illustrated in FIG. 7 is exemplary. Other embodiments may utilize different modules, or have several functions performed by one module, etc. The embodiment illustrated in FIG. 7 should therefore not be interpreted to be exclusive or limiting, but rather exemplary or illustrative.

Figure 8A:
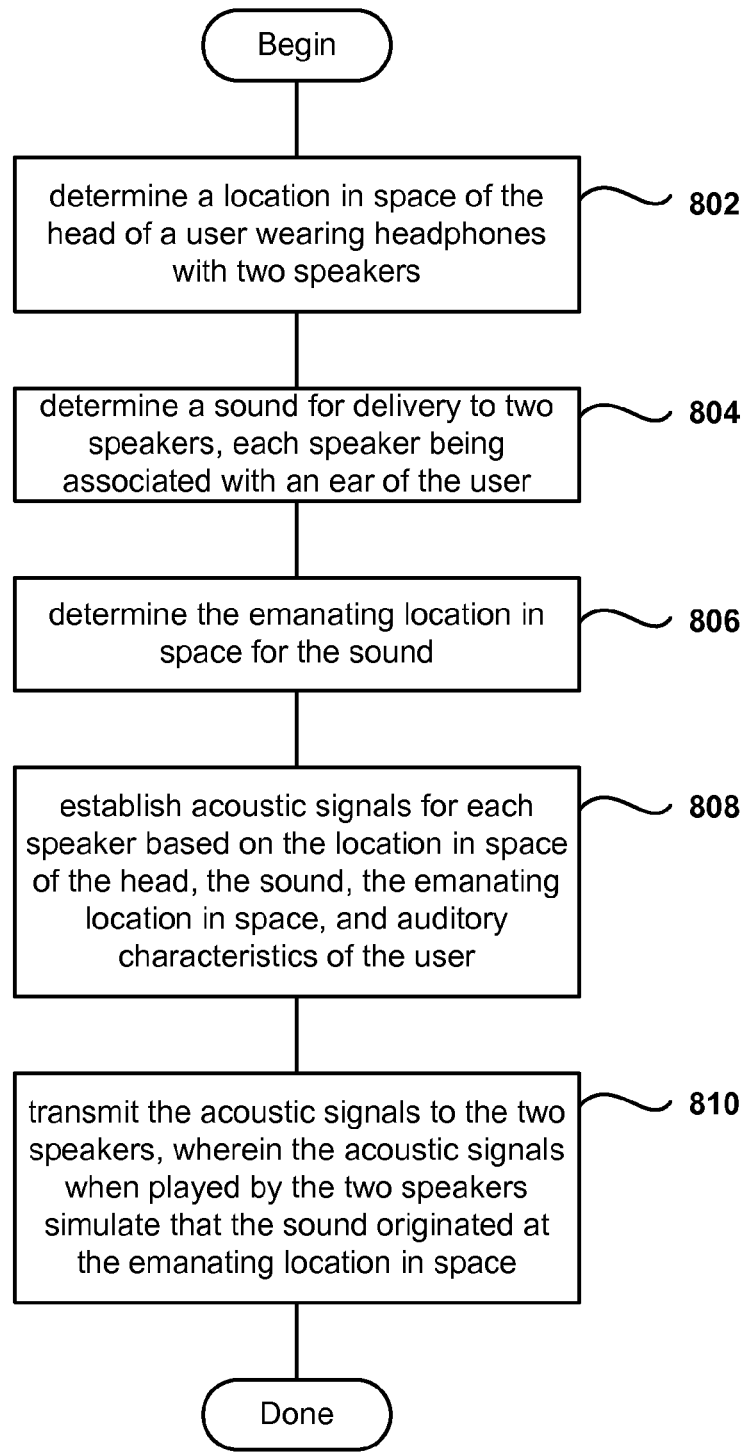
FIGS. 8A-8B show flowcharts of algorithms for simulating the source of sound, according to embodiments of the invention.
Figure 8B:
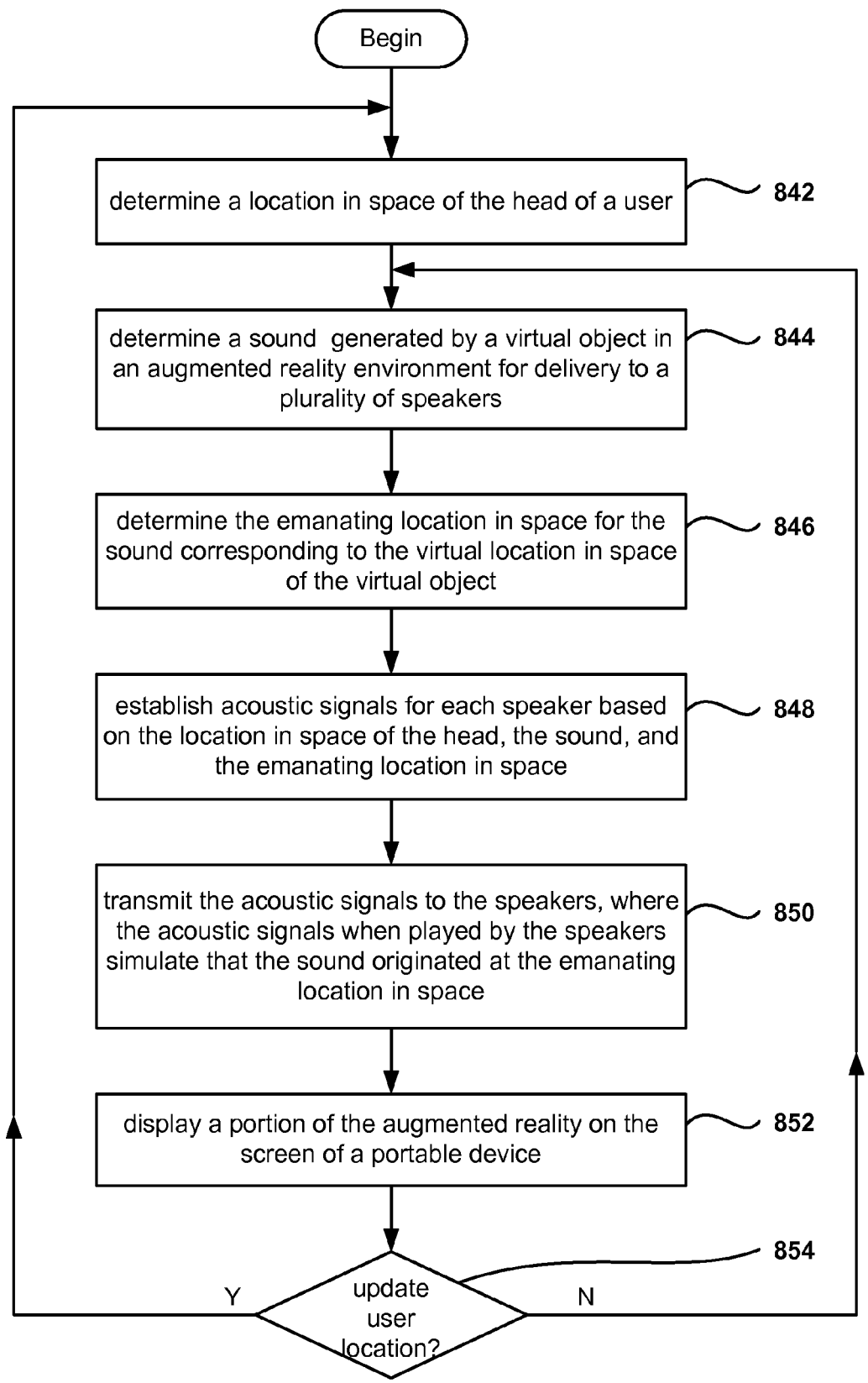

FIGS. 8A-8B show flowcharts of algorithms for simulating the source of sound, according to embodiments of the invention. FIG. 8A illustrates an embodiment for sound localization. In operation 802, a location in space of the head of the user is determined, where the user is wearing headphones that include two speakers. As previously described, a plurality of methods can be utilized to determine the location of the headphones, such as ultrasound, image analysis, RFID, GPS, infrared, etc. Further, in operation 804, the sound that is to be delivered to the speakers is determined, each speaker being associated with one of user's ears. In other words, one speaker is situated next to the left ear, and the other speaker is situated next to the right ear. In operation 806 the emanating location for the sound is determined. The emanating location for the sound refers to the point in space that defines a virtual origin for the sound that is to be delivered to the user, such that the user gets the impression that the sound is coming from that sound origin.

In operation 808, the acoustic signals for each speakers are established based on the location in space of the head, the sound, the emanating location in space, and the auditory characteristics of the user. The auditory characteristics of the user define the physical aspects of the user that affect how the user localizes where sound comes from. In one embodiment, the auditory characteristics of the user are defined by the pair of HRTFs for the user's ears.

After operation 808 the method flows to operation 810, where the acoustic signals are transmitted to the two speakers. When the acoustic signals are played by the two speakers the sound appears to have originated at the emanating location in space.

FIG. 8B illustrates the flowchart of a method for simulating the source of sound. In operation 842, the location in space of the head of the user is determined. In one embodiment, the user is wearing headphones that include two speakers, and in another embodiment, a plurality of speakers are located in a space around the user, e.g., in the room where the user is interacting with the computer device. In operation 844, the method determines the sound generated by a virtual object in an augmented reality environment, where the sound is to be delivered to the plurality of speakers. The emanating location in space for the sound, which corresponds to the virtual location in space of the virtual object, is determined in operation 846. For example, in one embodiment the sound is speech generated by an avatar that is standing on top of a real physical table.

Further, in operation 848, the acoustic signals for each speaker are established, based on the location in space of the head, the sound, and the emanating location in space. Once the acoustic signals are established, the acoustic signals are transmitted to the two speakers, in operation 850. The acoustic signals once played by the two speakers simulate that the sound originated at the emanating location in space. In operation 852, a portion of the augmented reality space, or the complete augmented reality space, is displayed on the screen of the portable device.

Since the person wearing headphones may move her head over time, tracking is required to periodically recalculate the location of the user. In addition, the emanating location for the sound may also change over time. As a result, continuous tracking of the positions of the user and the sound are required, and in operation 854 the method determines if the location of the user needs to be updated. In one embodiment, the location of the user is updated periodically (e.g., every 500 ms, although other values are also possible). If the check performed in operation 854 determines that the location is to be updated, then the method flows back to operation 842. On the other hand, if the check performed in operation 854 determines that an update of the location of the user is not required, the method flows back to operation 844 to determine a new sound for delivery to the headphones.

Figure 9A:
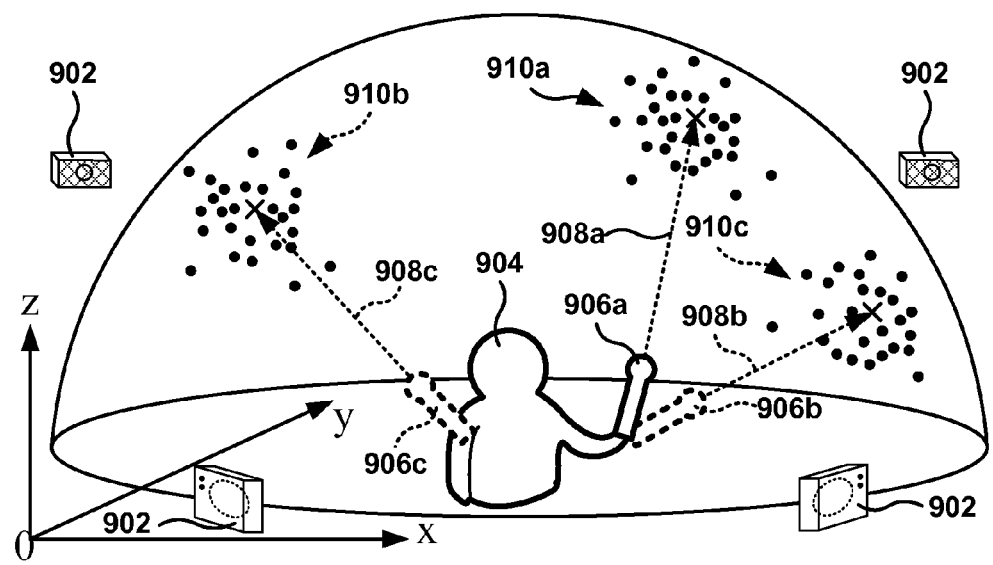
FIG. 9A illustrates a method for selecting a sound localization function based on the user perception of the sound received, according to one embodiment.

FIG. 9A illustrates a method for selecting a sound localization function based on the user perception of the sound received, according to one embodiment. Virtual surround through headphones works best with an accurate measurement of the person's HRTF (or some other sound localization function). The process to measure HRTF is difficult (i.e., the process requires putting small microphones in the person's ear, and sitting perfectly straight while a speaker is moved all around the head at various positions and distances). Embodiments of the invention utilize a database of measured HRTFs for a population of users. In one embodiment, a motion controller is utilized to create a sound localization function for the user that is based on one or more HRTF's from the database. The HRTF for the user is not actually measured, but by finding one or more HRTFs that "work" for the user, a realistic virtual surround system with localized sound delivery is provided.

It is not practical to have a sound localization function for millions of users. Embodiments of the invention utilize the measured sound localization functions for a representative segment of people, and then tests are performed to select one of these functions for a particular user.

In the embodiment of FIG. 9A, user 904 is in a room with a plurality of speakers 902. It should be noted, that the calibration process may also be performed when user 904 is wearing headphones. The computer system plays a sound through speakers 902, and the user is asked to point controller 906A in the direction 908a that the user believes was the source of the sound. Based on the direction 908a, identified by the user as the origin of the sound, the system selects one or more sound localization functions from the database that match this direction. In other words, after each response by the user 904, the system narrows the sound localization functions that could meet the characteristics of user 904.

In one embodiment, the user is offered two choices. If the user is not sure where the sound is coming from, a first button is pressed on the controller to indicate that the user is not sure. On the other hand, if the user identifies a direction, the user presses a second button while pointing in the direction of the sound. This allows people to find an appropriate sound localization function by searching through the database of sound localization functions (e.g., HRTFs), and find the function that most closely matches the user input (e.g., the direction identified by the controller).

The process is repeated with other sounds at different locations. A new direction (e.g., 908b, 908c) is obtained for each sound based on the location of the controller (e.g., 906b, 906c), and the sound localization functions are analyzed to find the best match for the location. In one embodiment, the best match is the sound localization function that offers the best overall performance for all test sounds.

In another embodiment, the function for this particular user is a combination of sound functions, where the space around the user is divided into sectors, and sounds coming from each sector use a function associated with that sector, where each sector has a different associated function. In one embodiment, interpolation is used, and some of the sectors use interpolation from two or more functions. The desired goal is not to have a perfectly chosen function, but rather the goal is to have a number of acceptable functions at various locations, which are sufficient to fill up the required 3D volume for a specific game, or for a range of games. If it is deemed that a certain number of discrete transfer functions is better than selecting just one function, then there is no need to just select one function. In one embodiment, interpolation is used to fill the gaps in areas where actual testing has not been performed, as it would be very tedious to perform tests for the whole 3-D space around the user.

The sound played for each test may be the same sound, but projected from a different location, or the sound may change from location to location in order to acquire data for different audio frequencies. This may reduce user confusion because the user will not feel that all the sounds are exactly the same, and that the sounds are coming from the same place.

If one transfer function does not properly match the sound characteristic of the user for all test sounds, in one embodiment, the sound function calculated for the user is a combination of functions that take into account, not only the area where the sound is coming from, but also the type of sound (e.g. the dominating frequency for the sound) being produced. For example, in a particular spot in the 3-D space, a first function may be use for low frequency sounds, and a second function for high or medium frequency sounds.

Since the function associated with user 904 is not known, a sound localization function $f_1$ from the database is chosen to begin the calibration process. When the user points 906a in direction 908a the system analyzes what localization function $f_u$, or functions, may cause this response when the sound is generated using $f_1$. In other words, the system needs to correlate $f_1$ with other functions in the database. If s is the sound selected for the test (e.g., a dog bark), $l_1$ is the location of the sound, and $ls_1$ is the localized sound delivered at the speakers, equation (1) becomes:

$$ls_1 = f_1(s, l_1) \qquad (2)$$

When the user points in direction 908a, a location $l_2$ is calculated based on direction 908a. If $f_u$ is a function that matches sound s user for this sound and location $l_2$, then the following equation is obtained:

$$ls_1 = f_u(s, l_2) \qquad (3)$$

This means, that for the same sound test (e.g., the dog bark), $f_1$ and $f_u$ would produce the same sound sent to the speakers, but the location perceived by the user changes because of the different sound localization functions. In other words, a user with a function of $f_1$ perceives the sound coming from $l_1$, and a user with function $f_u$ perceives the same sound coming from $l_2$.

Combining equations (2) and (3), the following identity is obtained:

$$f_1(s, l_1) = f_u(s, l_2) \qquad (4)$$

Since $f_1$, s, $l_1$, and $l_2$ are known, $f_u$ can be obtained utilizing equation (4). However, it is noted that $f_u$ works for this user for location $l_2$, but $f_u$ may not work for other locations. Since equation (4) might be satisfied for many functions in the database, continuing with the tests in different locations allows the system to select which of the possible functions better works for this user. In one embodiment, the testing process continues by eliminating the functions that do not work, until one final function is selected (the one that better matches the characteristics of the user).

In one embodiment, the same function $f_1$ is used for all the tests. In another embodiment, the function used for each test changes as the system starts fine-tuning the function, or functions, that work best for this user. For example, in the second test, the chosen function $f_u$ obtained in the previous test is used for the second test, instead of $f_1$. After the second test, a new function $f_{u2}$ is selected based on the two measurements. And the process is repeated to calculate a new function after each test, based on the measurements from all the tests.

It is noted that if the user moves the head while the calibration is taking place, the movement may alter the results. In one embodiment, the sound is short, and the effect of head movement is eliminated, or substantially reduced. In another embodiment, the head of the user is tracked, which means that the location of the ears is known during the test. In one embodiment, the head tracking is performed by analyzing images taken of the user, but other methods may also be utilized, such as using headphones with a magnetometer, etc.

Figure 9B:
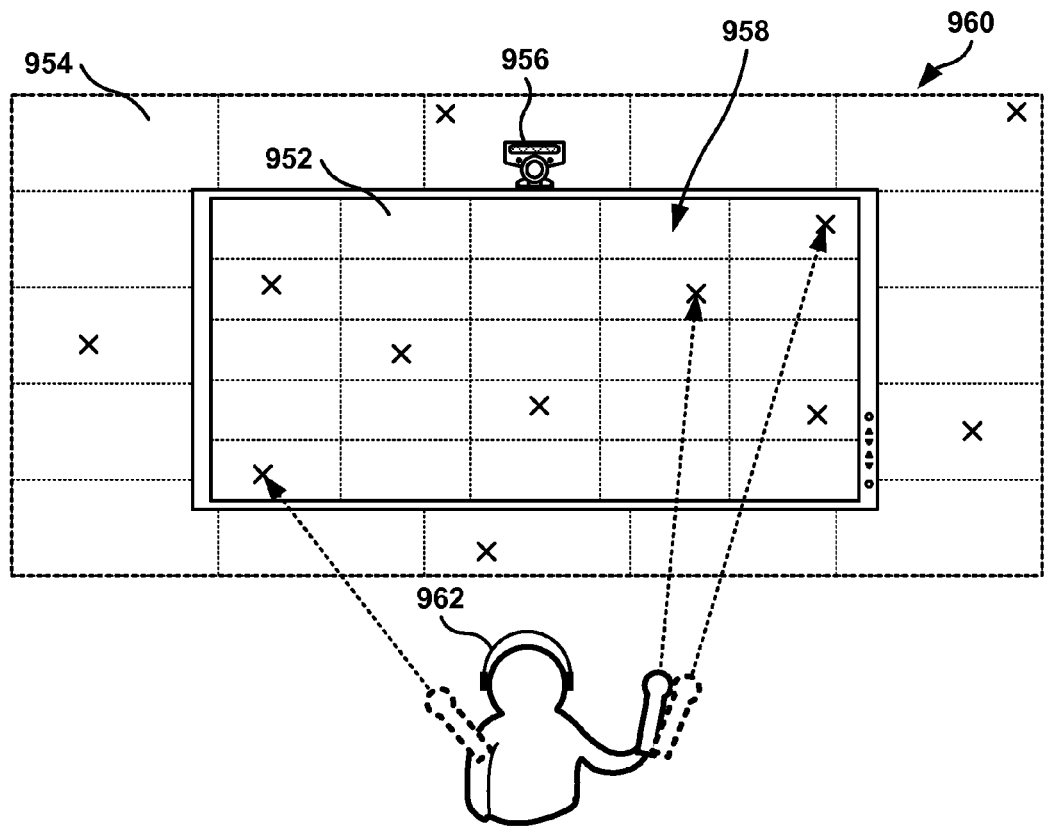
FIG. 9B illustrates a method for selecting a sound localization function based on perception of sounds originated in front of the user, according to one embodiment.

FIG. 9B illustrates a method for selecting a sound localization function based on perception of sounds originated in front of the user, according to one embodiment. User 904, wearing headphones 962, is situated in front of display 952 and camera 956, which is used to take images of the user and the controller held by the user. Camera 956 is connected to a computing device (not shown). In the embodiment shown in FIG. 9B, the calibration is restricted to points in front of the user. The test points for the calibration may be on the display 952, or in the wall 954 situated behind display 952.

The testing procedure is similar to the procedure described above with reference to FIG. 9A, except that the user is aware of the distance to the sound, because the sound is on the display 952, or on the wall 954. In addition, the system is able to calculate the distance between the user 904 and the display 952, and between the user 904 and the wall 954. The testing sounds are localized to simulate that the sound originates on the display or on the wall. Further, the distance between the user 904 and the sound is equal to the distance between the user and the sound origin location on the display 952, or between the user and the sound origin location on the wall 954. In another embodiment, objects around the user can also be utilized for testing. This way, the distance between the object and the user is also known, and the distance can be utilized for the calibration procedure.

It is noted that the calibration procedures of FIGS. 9A and 9B are better than just knowing the user's HRTF, because the subjective part of the user (related to the user's perception of sound) is also taken into account during the calibration process. As described above, measuring HRTF involves putting microphones in the user's ears, but HRTF does not account for what happens after the sound enters the ear canal. The system ties the user's impressions to a physical location. Rather than using a "perfect" approach, where the system develops an exact model of the person's ear, the system can actually adjust the performance to a person's individual bias. If the person believes that a specific sound appears to come from a direction, regardless of whether it matches that person's HRTF, the system will provide a more compelling experience than by just using the HRTF.

The calibration methods described above, not only provide an intuitive interface for choosing a sound localization function, but the calibration methods also provide a registration between where the user perceives that the sound is originating, and the position of a motion controller. In one embodiment, the position of the controller and the head of the user, together with the sound localization function, are used to simulate that sound is coming out of the motion controller as the controller is being moved about.

Figure 10A:
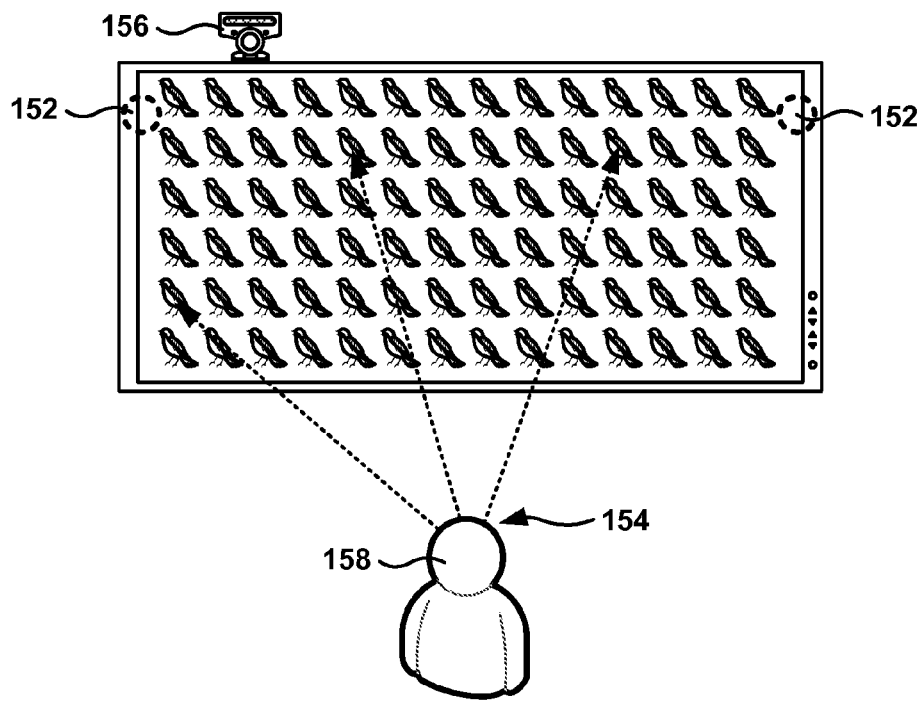
FIG. 10A illustrates a method for selecting a sound localization function using audio and video cues, according to one embodiment.

FIG. 10A illustrates a method for selecting a sound localization function using audio and video cues, according to one embodiment. The embodiment of FIG. 10A utilizes gaze detection and visual cues to perform the calibration. In addition, the calibration process can be part of the game, which gives points or rewards as the test progresses. Camera 156 and a computing device (not shown) are utilized to detect the gaze 154 of user 158. Speakers 152 are embedded in the television set and are used to deliver the localized sound.

For the calibration, the screen is filled with potential targets for the gaze of the user. The targets are visual cues that help the user identify the origin of the sound. The example shown in FIG. 10A includes a plurality of birds, and the sound test is one bird chirp, which may change from test to test. After each sound prompt in the calibration process, the user aims her gaze at the object in the display that the user believes originated the sound. In one embodiment, an animation takes place to show the bird that was selected, such as having the bird fly away, disappear, fall to the ground, etc.

In one embodiment, there is a feedback loop in the process which allows the user to perform corrections from previous inputs. A 3D visualization is provided to the user mapping all the 3D locations that the user selected. The system allows the user to redefine the perceived locations, as well as relate the inputs to each other. For example, a user may specify that "this sound is in front of that one," or that "this sound is behind that one." If the various sounds are placed in a visual representation and can be selected individually, then the user is able to use the information to re-place sound samples. For example, the user may indicate that "this sound is right in front of me," but then hear another sound at a later time and specify that "the new sound is the one that is right in front of me." The user is able to select the original "right in front" sound, confirm that the sound is not positioned as she originally thought, and either discard or reposition that sample.

Figure 10B:
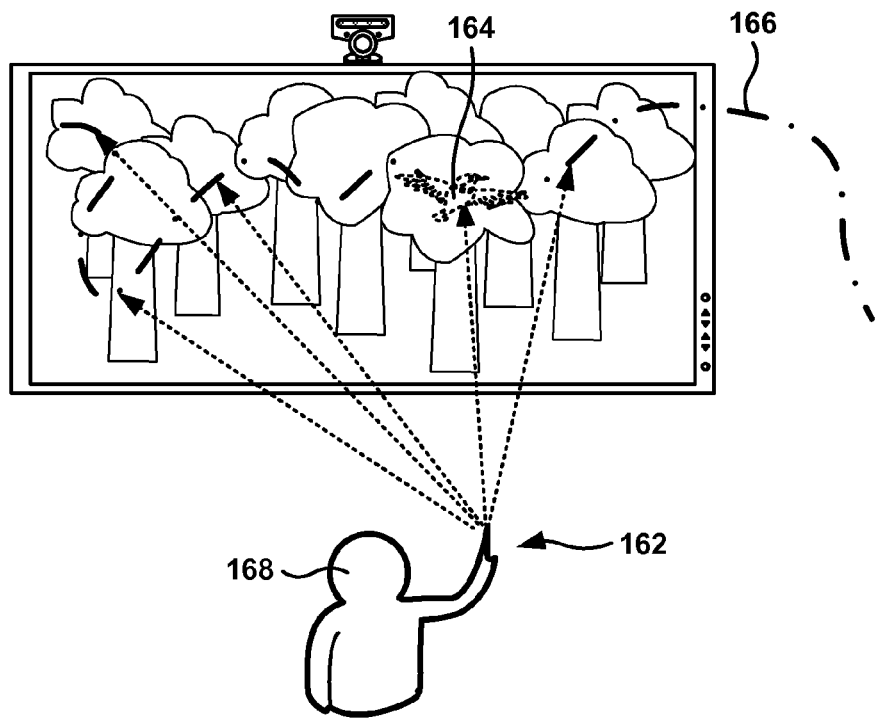
FIG. 10B illustrates a method for selecting a sound localization function by continuously pointing to a perceived sound origin that is moving in front of the user, according to one embodiment.

FIG. 10B illustrates a method for selecting a sound localization function by continuously pointing to a perceived sound origin that is moving in front of the user, according to one embodiment. In one embodiment, the calibration test includes playing a sound sequence where the sound origin changes, simulating that the sound origin is moving. The embodiment of FIG. 10B utilizes sign analysis for the sound calibration. In this case, the user 168 points 162 with her finger to indicate where the sound is coming from.

For example, the sound is a bird 164 that is moving in a forest along trajectory 166, but the bird is not visible because it is flying inside the forest. It is noted that trajectory 166 may stay within the area of the display, or the trajectory may expand beyond the boundaries of the display. As the bird moves, the user 168 points 162 to the location where the user believes that the bird is at that time.

The system analyzes the direction identified by the finger pointing direction, and uses a similar process to the process described above for calculating a sound localization function for the user. In one embodiment, the system samples periodically the user input and the corresponding sound. The obtained discrete samples are then used to calculate the sound function, as described above.

In one embodiment, the sound localization function for a user is stored in a server on the network, which is accessible by many devices. The sound localization function can then be shared with other devices, in order to deliver sound localization in other devices. For example, the user may use a game console to calculate the function, and then sound localization can be provided to the user when the user is wearing headsets connected to a portable device.

It is noted that the embodiments illustrated in FIGS. 9A-9B and 10A-10B are exemplary. Other embodiments may utilize different sounds, different configuration of speakers, use different inputs (e.g., controller, direction of a handheld device, signs made by the user, etc.), use different types of speakers (e.g., headsets, speakers in a room, speakers on a TV, etc.). The embodiments illustrated in FIGS. 9A-9B and 10A-10B should therefore not be interpreted to be exclusive or limiting, but rather exemplary or illustrative.

Figure 11:
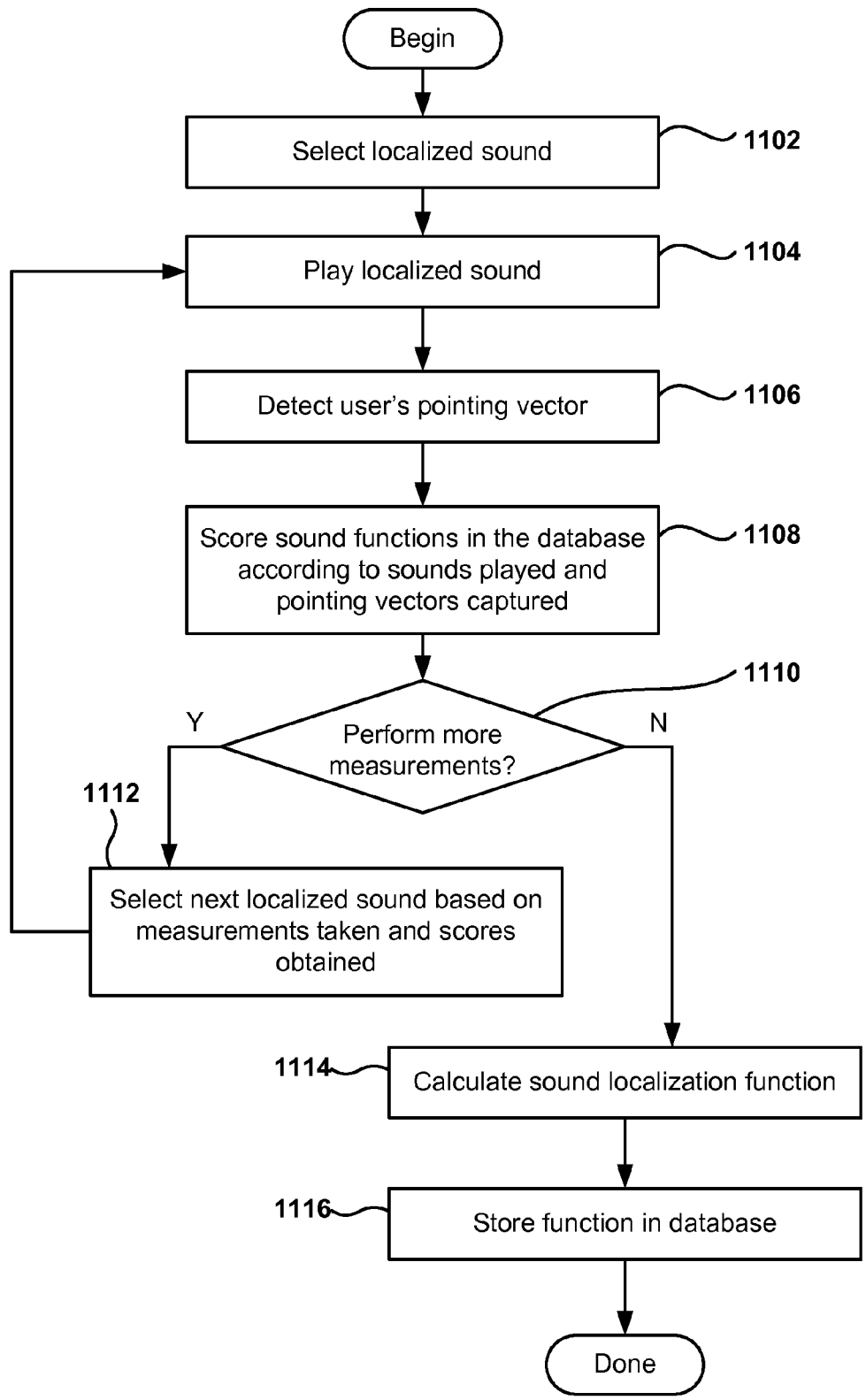
FIG. 11 shows a flowchart for selecting one or more sound localization functions, according to one embodiment.

FIG. 11 shows a flowchart for selecting one or more sound localization functions, according to one embodiment. In operation 1102, a sound is selected for performing a first test. The sound is localized to make it appear that the sound originates at a certain location. In operation 1104, the sound is played through a plurality of speakers, such as for example, a surround system, a pair of headsets, speakers embedded in a TV set, etc.

The user is prompted to indicate where the sound is coming from. In operation 1106, the user's input is detected, and the user's input is used to determine a pointing vector in space going from the user to the perceived sound origin. In operation 1108, sound localization functions stored in a database are analyzed, and a score is given to the functions based on the sound that was played and the captured pointing vector. The scores are used to filter out some of the possible functions to be used for sound localization for this user.

In operation 1110, the method determines if more measurements are needed to continue narrowing down the list of candidate functions. If more measurements are not required, the method continues to operation 1114, and to operation 1112 otherwise. In operation 1112, a new localized sound is selected, based on the results are already obtained. In one embodiment, the sounds are predetermined and the system circles through the list of sounds until the list is exhausted. For example, the list may include seven different sounds from seven different locations. After receiving the corresponding seven inputs, the system then selects one function for the user (operation 1114). In another embodiment, the method adapts to the received inputs and selects the next sound based on the previous mission. For example, the system may be down to three different candidate functions, and the sound is selected that would provide good guidance for selecting which is the best of the three functions.

In operation 1114, the sound localization function is calculated for the user. See for example the embodiments described above with reference to FIGS. 9A-9B and 10A-10B. Further, in operation 1116, the calculated sound localization function is stored in a database so other devices can use the function for localizing sound to this user.

Figure 12:
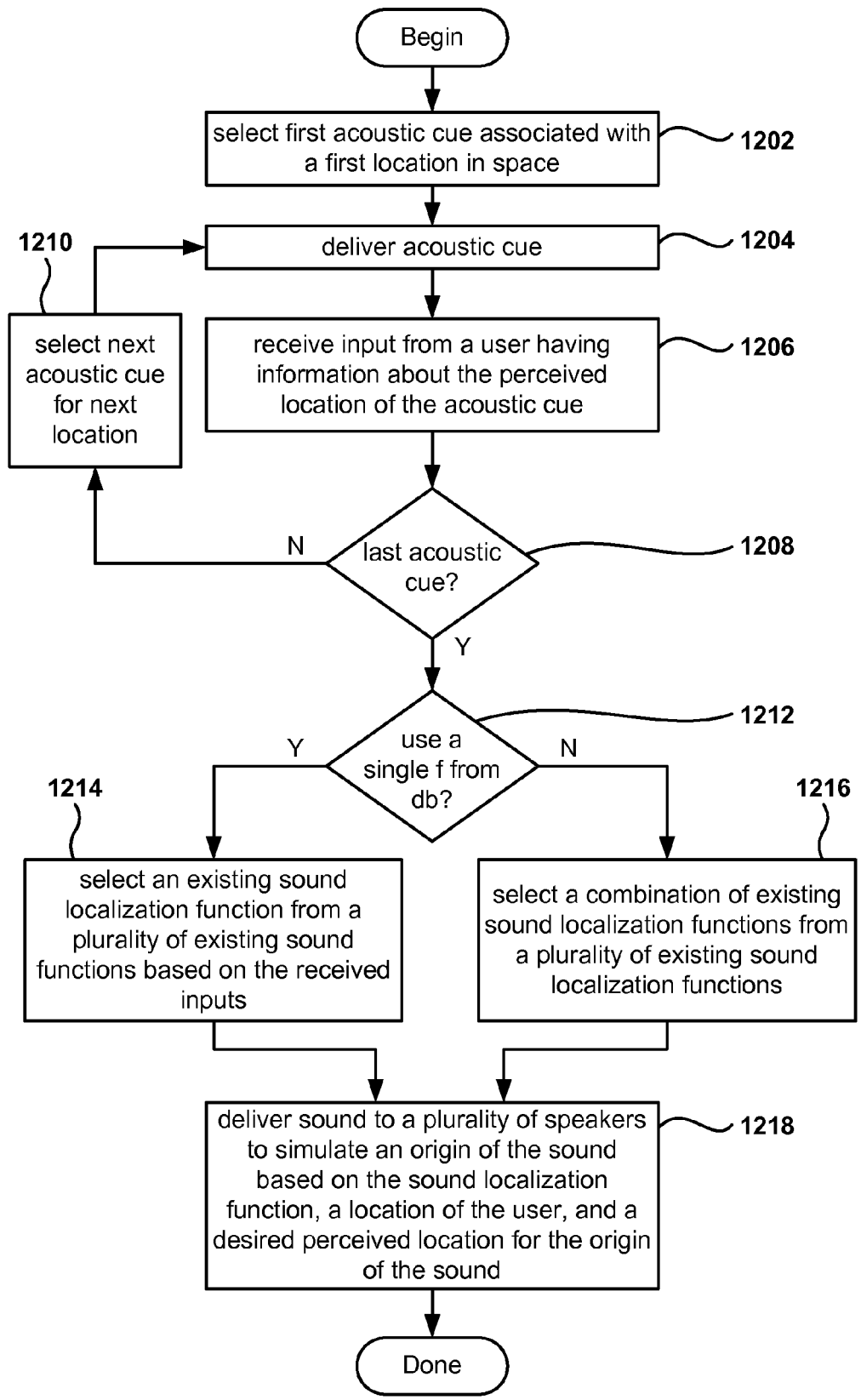
FIG. 12 shows a flowchart for selecting one or more sound localization functions from a database of sound localization functions, according to one embodiment.

FIG. 12 shows a flowchart for selecting one or more sound localization functions from a database of sound localization functions, according to one embodiment. In operation 1202, a first acoustic cue associated with a first location in space is selected, and in operation 1204, the acoustic cue is delivered via speakers. After the acoustic queue is delivered, the system receives input from the user in operation 1206. The input from the user has information about the perceived location of the acoustic cue.

In operation 1208, the method checks if the last acoustic was delivered in operation 1204. If it was the last acoustic cue, the method continues to operation 1212, and to operation 1210 otherwise. In operation 1210, the method selects the next acoustic cue and the location where the acoustic cue originates. After operation 1210, the method goes back to operation 1204 to deliver the new acoustic cue.

In operation 1212, a new check is performed to determine if a single sound localization function is to be used for this user, or if a combination of sound functions is to be used for the user. For example, if the system determines that there is a sound localization function that matches well this user with the delivered tests, then the system will use this function, which was retrieved from the database of sound functions. However, if there is not a good match for this user, the system will use a combination of functions that are divided according to the section in space that best matches each of the functions.

Therefore, in operation 1214 the method selects an existing sound localization function from the database, based on the received user inputs. On the other hand, in operation 1216, the method selects a combination of sound localization functions from the database for this user. In operation 1218, sound is delivered to a plurality of speakers in order to simulate the origin of sound, based on the sound localization function, the location of the user, and the desired perceived location for the sound origin.

Figure 13:
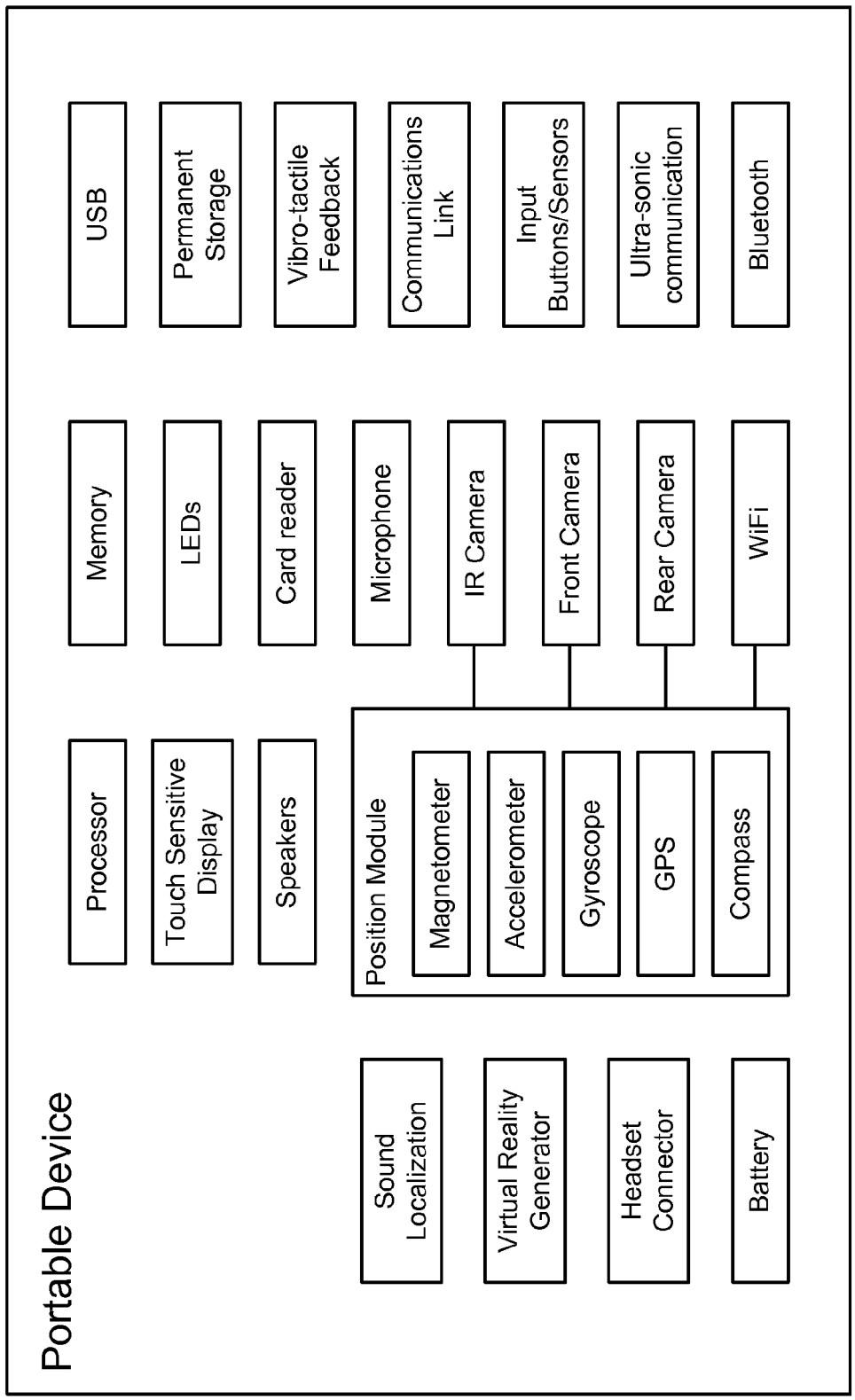
FIG. 13 illustrates the architecture of a device that may be used to implement embodiments of the invention.

FIG. 13 illustrates the architecture of a device that may be used to implement embodiments of the invention. The portable device is a computing device and include typical modules present in a computing device, such as a processor, memory (RAM, ROM, etc.), battery or other power source, and permanent storage (such as a hard disk). Communication modules allow the portable device to exchange information with other portable devices, other computers, servers, etc. The communication modules include a Universal Serial Bus (USB) connector, a communications link (such as Ethernet), ultrasonic communication, Bluetooth, and WiFi.

Input modules include input buttons and sensors, microphone, touch sensitive screen, cameras (front facing, rear facing, depth camera), and card reader. Other input/output devices, such as a keyboard or a mouse, can also be connected to the portable device via communications link, such as USB or Bluetooth. Output modules include a display (with a touch-sensitive screen), Light-Emitting Diodes (LED), vibro-tactile feedback, and speakers. Other output devices, such as headphones, can also connect to the portable device via the communication modules.

Information from different devices can be used by the Position Module to calculate the position of the portable device. These modules include a magnetometer, an accelerometer, a gyroscope, a GPS, and a compass. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

A Virtual Reality Generator creates the virtual or augmented reality, as previously described, using the position calculated by the Position Module. A view generator creates the view that is shown on the display, based on the virtual reality and the position. The Sound Localization module performs sound localization for sounds to be delivered to speakers or headphones.

It should be appreciated that the embodiment illustrated in FIG. 13 is an exemplary implementation of a portable device. Other embodiments may utilize different modules, a subset of the modules, or assign related tasks to different modules. The embodiment illustrated in FIG. 13 should therefore not be interpreted to be exclusive or limiting, but rather exemplary or illustrative.

Figure 14:
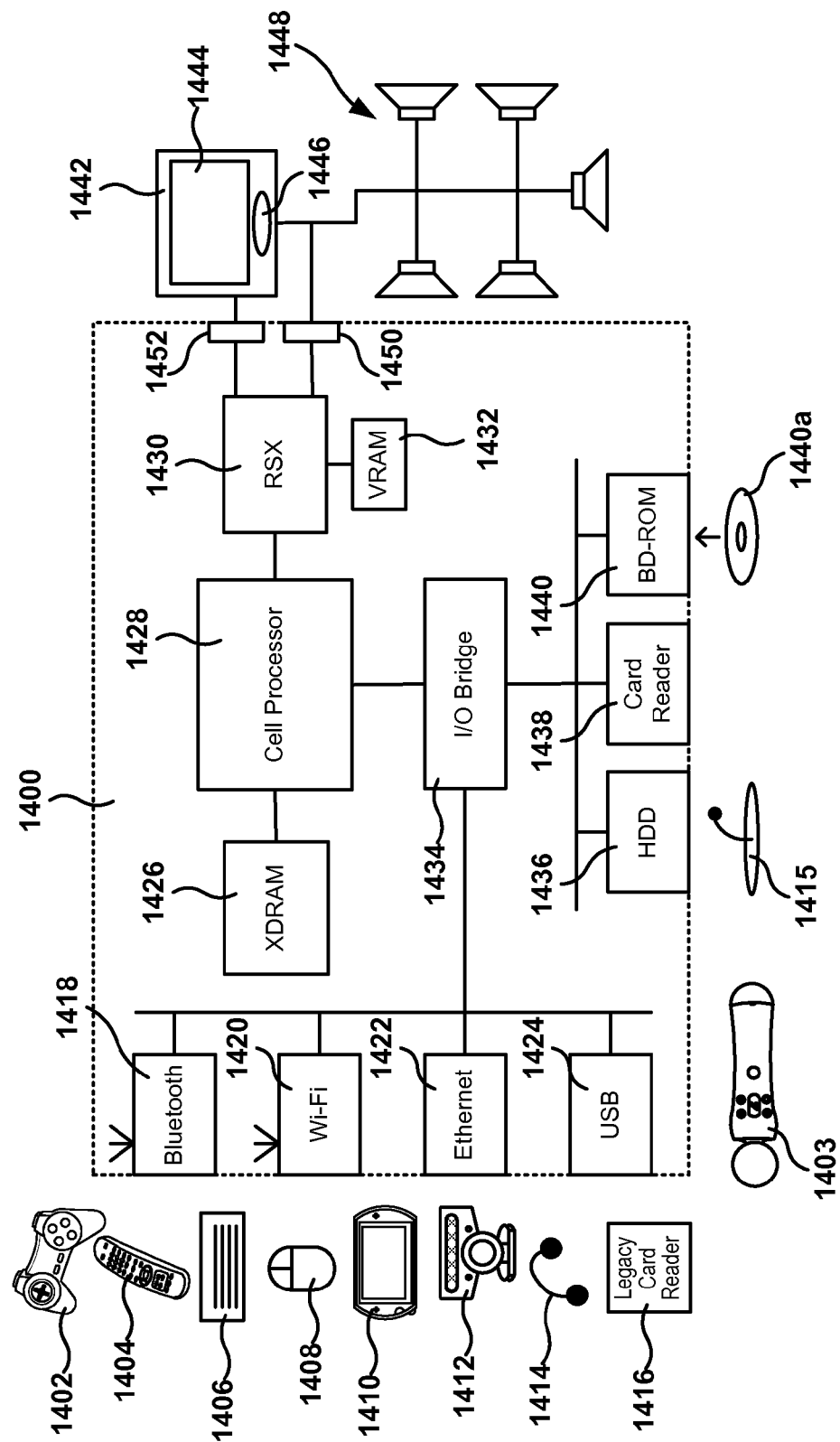
FIG. 14 illustrates hardware and user interfaces that may be used to implement embodiments of the invention.

FIG. 14 illustrates hardware and user interfaces that may be used to implement embodiments of the invention. FIG. 14 schematically illustrates the overall system architecture of the Sony® PlayStation® 3 entertainment device. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu-ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony PSP® entertainment device; a video camera such as a PlayStation® Eye Camera 1412; headphones 1414; and a microphone 1415. Such peripheral devices may therefore in principle be connected to the system unit 1400 wirelessly; for example the portable entertainment device 1410 may communicate via a Wi-Fi ad-hoc connection, while the headphones 1414 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1416 may be connected to the system unit via a USB port 1424, enabling the reading of memory cards of the kind used by the PlayStation or PlayStation 2 devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, an imperfect sphere, a soccer ball, a football or rugby ball, a section of a sphere, a truncated pyramid, a truncated cone, a baseball bat, a truncated cube, a polyhedron, a star, etc., or a combination of two of more of these shapes.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu-ray Disk BD-ROM reader 1440 and for the navigation of disk content.

The Blu-ray Disk BD-ROM reader 1440 is operable to read CD-ROMs compatible with the PlayStation and PlayStation 2 devices, in addition to conventional pre-recorded and recordable CDs, and so-called Super Audio CDs. The reader 1440 is also operable to read DVD-ROMs compatible with the PlayStation 2 and PlayStation 3 devices, in addition to conventional pre-recorded and recordable DVDs. The reader 1440 is further operable to read BD-ROMs compatible with the PlayStation 3 device, as well as conventional pre-recorded and recordable Blu-ray Disks.

The system unit 1400 is operable to supply audio and video, either generated or decoded by the PlayStation 3 device via the Reality Synthesizer graphics unit (RSX) 1430, through audio 1450 and video 1452 connectors to a display and sound output device 1442 such as a monitor or television set having a display 1444 and one or more loudspeakers 1446, or stand-alone speakers 1448. In one embodiment, voice and gaze inputs are utilized to play sound toward specific audio speakers according to the Point of Gaze (POG) of the user. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The PlayStation 3 device's operating system supports Dolby® 5.1 surround sound, Dolby® Theatre Surround (DTS), and the decoding of 7.1 surround sound from Blu-ray disks.

In the present embodiment, the video camera 1412 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for simulating a source of sound, the method comprising:
    determining, by a computer, a location in physical space of a head of a user, wherein the location is determined by capturing images by a camera of the physical space in which a user is located and identifying light from at least one light emitting diode (LED) disposed on the head of the user;
    determining, by the computer, a sound for delivery to two speakers worn by the user;
    determining, by the computer, an emanating location in the physical space for the sound;
    establishing, by the computer, acoustic signals for each speaker based on the location in the physical space of the head, the sound, the emanating location in the physical space, and auditory characteristics of the user, wherein the auditory characteristics of the user are identified based on a calibration process, the calibration process is configured to generate one or more sounds in the physical space and a user is requested to respond by moving a controller having a light proximate to where the user perceives the sound to be emanating, the camera identifying positions of the controller when moved by the user, the response of moving the controller and the generated one more sounds used to identify the auditory characteristics of the user, and wherein the acoustic signals are established to simulate for the user that the sound originates at the emanating location in the physical space when the acoustic signals are played by the two speakers; and
    transmitting, by the computer, the acoustic signals to the two speakers.

2. The method as recited in claim 1, further including:
    calculating new acoustic signals for transmission to the two speakers based on updates to any of the location in the physical space of the head, the sound for delivery to the two speakers, or the emanating location.

3. The method as recited in claim 1, wherein the sound is generated by a virtual object in an augmented reality environment, the augmented reality environment including one or more virtual objects imposed on a real-world view having real objects, wherein the emanating location is a simulated location in the physical space of the virtual object.

4. The method as recited in claim 3, further including:
    displaying a portion of the augmented reality on a screen, wherein the acoustic signals played by the two speakers provide an acoustic clue to the user regarding the simulated location in the physical space of the virtual object.

5. The method as recited in claim 4, wherein establishing acoustic signals further includes:
    providing a higher volume to the acoustic signals when the virtual object is displayed on the screen than when the virtual object is not displayed on the screen.

6. The method as recited in claim 1, wherein the auditory characteristics of the user is selected as a best match of a head-related transfer function (HRTF) for the user based on the calibration process, the HRTF of a listener defining how sound arriving at an eardrum of the listener is modified based on an anatomy of the listener, wherein the established acoustic signals for each speaker are based on the HRTF of the user.

7. A method for simulating a source of sound in a virtual space, the method comprising:
    tracking, by a computer, a location in physical space of a head of a user, wherein the location is determined by capturing images by a camera, controlled by the computer, of the physical space in which a user is located and identifying light from at least one light emitting diode (LED) disposed on the head of the user for facilitating said tracking;

determining, by the computer, a sound for delivery to headphones worn by the user;

determining, by the computer, an emanating location in virtual space rendered on a screen for the sound;

establishing, by the computer, acoustic signals for the headphones based on the location in the physical space of the head, the emanating location in the virtual space, and auditory characteristics of the user, wherein the auditory characteristics of the user are determined based on a calibration process for the user, the calibration process is configured to generate one or more audio cues in the virtual space and a user is requested to respond by moving a controller having a light proximate to where the user perceives the sound to be emanating, the camera identifying positions of the controller when moved by the user and positions of the head of the user, and wherein the acoustic signals are established to simulate for the user that the sound originates at the emanating location in the virtual space when the acoustic signals are output by the headphones; and transmitting, by the computer, the acoustic signals to the headphones.

* * * * *